US012711872B2

(12) United States Patent
Eberhardt, III et al.

(10) Patent No.: US 12,711,872 B2
(45) Date of Patent: Aug. 18, 2026

(54) TRANSPORTATION INFORMATION EXCHANGE ENGINE SYSTEM AND METHOD

(71) Applicant: AirDex, Inc., Fredericksburg, VA (US)

(72) Inventors: John Stephen Eberhardt, III, Winchester, VA (US); Matthew Joseph Scott Drew, Alexandria, VA (US); Eric Shofstall Kucks, Verona, VA (US); Boris Stanimirov Boiko, Baltimore, MD (US); Andrew Scott Beals, Overland Park, KS (US); Mitchell Robert Horning, Reston, VA (US)

(73) Assignee: AirDex, Inc., Fredericksburg, VA (US)

( * ) Notice: Subject to any disclaimer, the term of this patent is extended or adjusted under 35 U.S.C. 154(b) by 61 days.

(21) Appl. No.: 18/814,195

(22) Filed: Aug. 23, 2024

(65) Prior Publication Data

US 2025/0061811 A1 Feb. 20, 2025

Related U.S. Application Data

(63) Continuation of application No. 18/486,700, filed on Oct. 13, 2023, now Pat. No. 12,131,650.

(60) Provisional application No. 63/415,859, filed on Oct. 13, 2022.

(51) Int. Cl.
*G08G 5/26* (2025.01)
*G07C 5/00* (2006.01)
*G07C 5/08* (2006.01)

(52) U.S. Cl.
CPC ............... *G08G 5/26* (2025.01); *G07C 5/008* (2013.01); *G07C 5/0808* (2013.01)

(58) Field of Classification Search
CPC ......... G08G 5/26; G07C 5/008; G07C 5/0808
See application file for complete search history.

(56) References Cited

U.S. PATENT DOCUMENTS

2023/0035814 A1* 2/2023 Borgyos .................. G08G 5/55

* cited by examiner

*Primary Examiner* — Michael V Kerrigan
(74) *Attorney, Agent, or Firm* — Pillsbury Winthrop Shaw Pittman LLP

(57) ABSTRACT

Provided is a method of transportation information exchange that includes receiving first data from a first aviation data source, such that the first data is provided in a first data format type and determining, based on a set of routing rules, a first aviation consumer of at least a first portion of the first data. The method further includes processing the first portion of the first data into a second data format type associated with the first aviation consumer and providing the first portion of the first data in the second data format type to the first aviation consumer.

19 Claims, 10 Drawing Sheets

TRANSPORTATION INFORMATION EXCHANGE ENGINE SYSTEM AND METHOD

CROSS-REFERENCE TO RELATED APPLICATIONS

This patent is a continuation of U.S. patent application Ser. No. 18/486,700, filed Oct. 13, 2023, titled "Transportation Information Exchange Engine System and Method," which claims the benefit of U.S. Provisional Patent Application 63/415,859, filed Oct. 13, 2022, titled "Transportation Information Exchange Engine System and Method." Certain embodiments are related to transportation systems and methods, such as those described in U.S. patent application Ser. No. 17/947,549 filed Sep. 19, 2022 and titled "Unmanned Vehicle Risk Assessment System", which claims the benefit of U.S. Provisional Patent Application 63/280,852 filed Nov. 18, 2021 and titled "A Risk Based Trajectory Service for Unmanned Aerial Systems". The entire content of each afore-listed earlier-filed application is hereby incorporated by reference for all purposes.

FIELD OF THE DISCLOSURE

This disclosure relates generally to aviation and, more particularly, to transportation information exchange.

BACKGROUND

As new aviation modes become available, maintaining a safe and integrated airspace system is critical to the future development of aviation. Traditional aviation safety is based on cooperative behavior: namely that pilots and operators of aircraft are aware of the rules and each other and make efforts to follow them, avoid conflicts with each other, and share the airspace. Cooperation requires total awareness: Where am I? What rules apply to me here? What hazards and restrictions apply to me here? What is my flight intent? Who else is near me? What is their flight intent? How do I maintain positive communications with other aircraft in my vicinity?

SUMMARY

The following is a non-exhaustive listing of some aspects of the present techniques. These and other aspects are described in the following disclosure.

Some aspects include a process including: receiving, by a computer system, first data from a first aviation data source, wherein the first data is provided in a first data format type; determining, by the computer system based on a set of routing rules, a first aviation consumer of at least a first portion of the first data; processing, by the computer system, the first portion of the first data into a second data format type associated with the first aviation consumer; and providing, by the computer system, the first portion of the first data in the second data format type to the first aviation consumer.

Some aspects include a tangible, non-transitory, machine-readable medium storing instructions that when executed by a data processing apparatus cause the data processing apparatus to perform operations including the above-mentioned process.

Some aspects include a transportation information exchange service platform, including: one or more processors; and memory storing instructions that when executed by the processors cause the processors to effectuate operations of the above-mentioned process.

Figure 1:
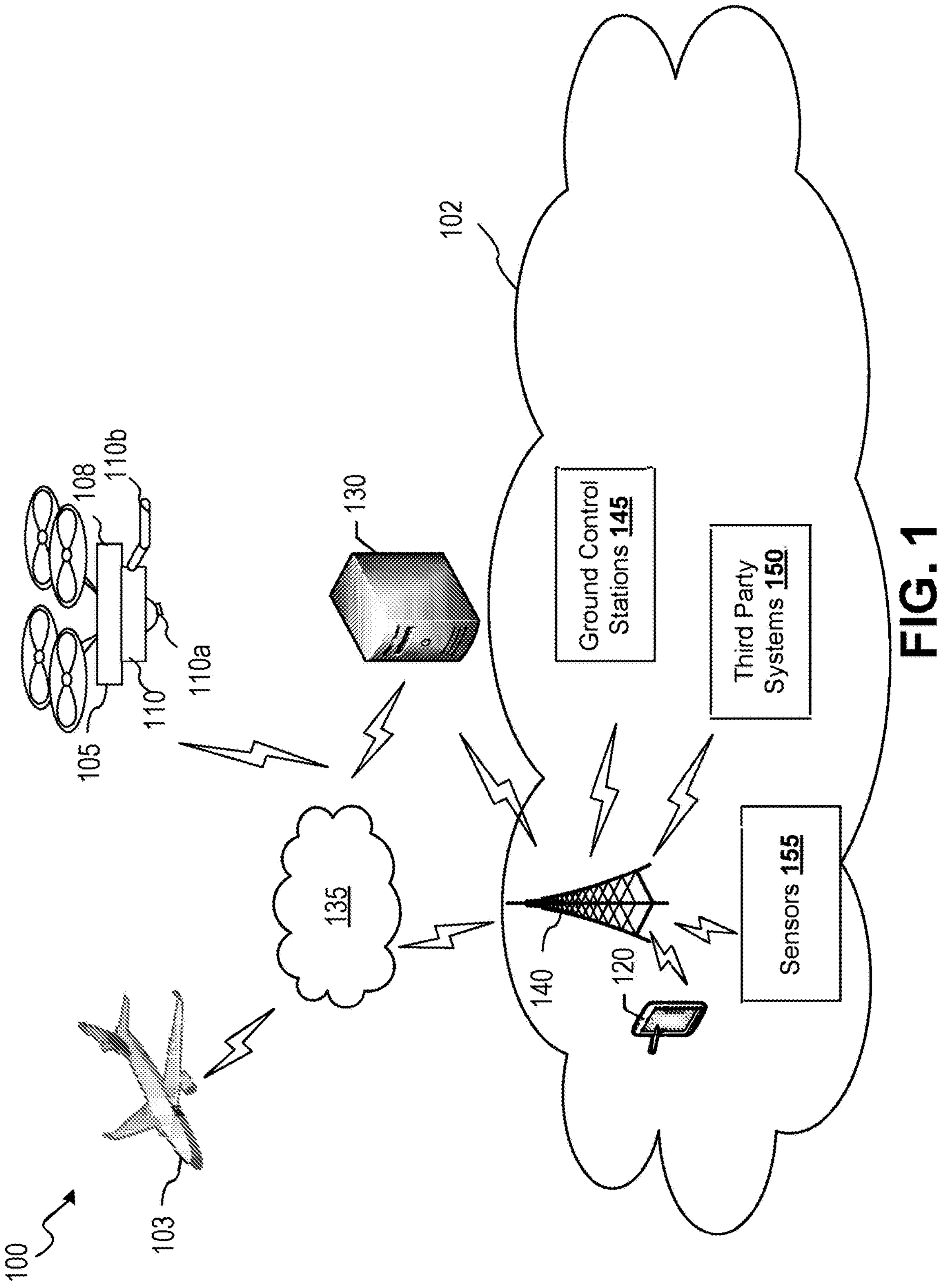
FIG. 1 is a schematic view illustrating an embodiment of a transportation information exchange system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of aviation and aviation information exchange. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As discussed above, cooperative airspace has largely been accomplished through a combination of Federal Aviation Administration (FAA) services and intensive pilot training so that human pilots that are onboard aircraft may make the correct interpretation of information presented and render safe decisions in operating their aircraft. FAA services may include charts that denote rules, procedures, hazards, obstructions, waypoints, and navigational aids; predefined route, approach, and departure procedures; strictly defined radio frequencies and protocols; as well as separation and approach control services at towered airports; or other services that would be apparent to one of skill in the art in possession of the present disclosure. Further, modern pilots may be aided by new digital technologies that assist pilots to gain additional awareness. Pilots may also benefit from digital avionics, referred to as "glass cockpit" that can display traffic, weather, navigational aids, rules and procedures geospatially on a screen in the cockpit. Additionally, pilots may benefit from automatic dependent surveillance-broadcast (ADS-B) transceivers, both digitally broadcasting position for consumption by other pilots as well as receiving broadcast position data for display on their own avionics. Further still, pilots may benefit from electronic flight bag (EFB) tools such as Foreflight, that display charts and maps with rules and received transponder data overlaid on the chart and data services such as flight information system broadcast (FIS-B) that can make pilots aware of rule changes, equipment outages, and weather in real-time. Finally, even without FAA services, cooperative pilots may even account for non-cooperative pilots (those without transponders or radio comms) by physically seeing these aircraft and accounting for potential risk by adjusting their flight plans and operations to avoid conflict due to their many years of training.

However, as new flight modes become pervasive and begin to outstrip conventional aviation traffic, many of these paradigms break down because the human pilot is not physically present to assess information and check it against their vision, assuming that a human pilot is even present, a computer pilot may not have the same ability to interact with information as a human, and the FAA has made it clear that it is not expanding current services. Therefore, achieving ubiquitous information sharing is critical to maintain a safe, efficient national air space. New aviation modes such as uncrewed aerial systems (UAS), electric vertical takeoff and landing (eVTOL) vehicles, and remotely piloted regional air mobility (RAM) vehicles are dramatically changing aviation by allowing for greater frequency of flight, especially in areas that do not receive FAA traffic management services, by pilots who are not onboard the aircraft and soon the aircraft will be flown through an automation system.

These new flights modes break the current, conventional, effective airspace safety system. Traditionally, the pilot's eyes are the "system of last resort" to prevent conflict—however, with the pilot no longer on board the pilot is missing a key piece of input to conduct safe operations as well as the subtle neurological context of physical presence. The result is that pervasive awareness is critical to replace the cognitive deficit resulting the lack of "eyes on" and local awareness that the human brain benefits from by being physically and geospatially present. However, the electronic conspicuity needed to replace the lack of "eyes on" and local awareness is hamstrung by the current siloed approach to airspace management with new technologies being operated in a siloed manner. Different vehicle types and flight modes are treated as "segregated" domains, with the attempt to segregate operational airspace, even though these vehicles de facto share the same airspace (consider the area in the vicinity of a general aviation (GA) airport). As a result, the very approach being taken to development is blocking the pervasive awareness needed to make these approaches accretive to airspace safety and performance.

For example, small UAS (defined as under 55 pounds) operate under the FAA's unmanned traffic management (UTM) framework, or on a visual self-responsible basis—while RemoteID (RID) transponders will help make these vehicles more conspicuous, current avionics do not receive these signals and even if equipped, RID is designed for law enforcement and the protocols, range, and data communicated does not easily provide relevant information to the manned pilot. EVTOL operate under an urban air mobility (UAM)/provider of services for UAM (PSU) paradigm within their own air traffic control system that interfaces with the FAA, but it is not clear how or when the FAA is going to integrate this information into their workflows. Further, the FAA does not explicitly require integration of this information into the avionics of conventional aircraft operators or UTM, nor does the eVTOL explicitly see the non-cooperative operator. RAM vehicles operate like conventional aircraft but with different pilot situational awareness. While they will be broadcasting position, the remote pilot needs additional data to maximize situational awareness and conventional pilots will assume that they are conventional manned aircraft when they in fact or not operated in the same manner-leading to potential conflict and safety hazards.

This domain-specific segregation of information restricts the ability for all operators in the airspace to be fully aware of their airspace, is restricting the ability for the industry to grow, is restricting the ability for the FAA to form and promulgate effective rules, and is reducing the overall safety of the airspace just at the moment it is becoming more crowded. In federal fiscal 2022, the FAA reported that the Air Traffic Organization (ATO) handled over 16 million commercial flights, and general aviation flew over 25.5 million flight hours, while there were over 800,000 registered drones and over 850,000 certified commercial and recreational drone pilots. Market forces and existing standards and regulatory decisions have created a segregated airspace, however in many areas this is not a practical solution.

The systems and method of the present disclosure are directed relevant to creating pervasive, real-time, cross domain situational awareness for all airspace participants. For example, the systems and methods of the present disclosure describe transportation information exchange system that includes a universal aviation-specific routing and processing engine that receives data from multiple, domain specific inputs, validates the data, processes and repackages the data into different domain-specific standards, and routes the data to transport/transmission methods for different recipients. The aviation routing and processing engine facilitates collection, translation, and routing of data between the different domain participants that all operate on different standards using different data transmission protocols and different information presentation paradigms. Specifically, the aviation routing and processing engine uses a common processing and routing framework to conform data across multiple standards, including in-line data validation, so that existing aviation systems and equipment can both provide and consume multi-domain data without modification or changes to existing standards. Conceptually, this allows different domain partners to be aware of each other's telemetry and exchange intents without having to modify existing systems. Conventional aviation participants continue to receive information on avionics and the radio, while next generation participants such as UAS, eVTOL, and RAM receive information on ground control stations directly or via their UAS Service Supplier (USS) or PSU. While the transportation information exchange system is described as relating to aviation, one of skill in the art in possession of the present disclosure will recognize that the transportation information exchange system may be adjusted to provide similar benefits to other transportation modes (e.g., shipping, ground vehicle transportation that includes autonomous vehicles, or other transportation modes that would be apparent to one of skill in the art in possession of the present disclosure).

The transportation information exchange system may use an event-driven architecture to process and route different types of aviation domain-specific data from data providers (e.g., participating systems, receivers, sensors) to data consumers (e.g., participating operators, avionics, ground control software or ground control stations (GCS), USS, PSU). The systems and method of the present disclosure including the aviation-specific routing and processing engine may include several key functional features such as, but not limited to: i) the ability to consume data from multiple domain producers, either via a representational state transfer (REST) hypertext transfer protocol (HTTP) transmission control protocol (TCP)/internet protocol (IP) interface, an HTTP TCP/IP interface, a TCP/IP transmission of binary data, a radiofrequency link, or a direct over-the-wire transfer of binary data; ii) the ability to explicitly consume data from standards-based aviation interfaces (e.g., American Society for Testing Materials (ASTM) F3442/F3442M-23, Radio Commission for Aeronautics (RTCA) DO-267A, RTCA DO-282B, RTCA DO-358B, Garmin GDL-90, geo-JavaScript Object Notation (JSON), ESRI Keyhole Markup Language (KML), and others); iii) the ability to explicitly consume raw binary data from sensors; iv) the ability to consume data from sensors pre-packaged in text-based standard or vendor proprietary formats; v) the ability to validate and process data received on these standards and interfaces; vi) the ability apply rules to these data to support transformation into a new standards based pre-packaged text formats or binary formats; vii) the ability to forward the data via a REST HTTP TCP/IP interface, an HTTP TCP/IP interface, a TCP/IP transmission of binary data, a radiofrequency link, or a direct over-the-wire transfer of binary data; and viii) the ability to validate and characterize performance parameters of the data and data services in-line with processing.

The aviation routing and processing engine may perform the cross-domain collection, validation, processing, and routing in the conceptual architecture described herein. The aviation routing and processing engine may include a collection of logical data manipulation modules that each perform a key function in cross-domain information exchange according to a pre-programmed set of standards and rules. The logical workflows of the aviation routing and processing engine may include: i) the ingress of producer data to a service point on the aviation routing and processing engine through a defined transmission protocol; ii) the initial ingestion of data into the aviation routing and processing engine through a data validation sub-engine that may validate the message against a pre-defined data structure as defined in a data standard or vendor proprietary data documentation that then forwards validated data or reports erroneous data; iii) a parsing and processing sub-engine that may convert the received data into a generic set of attributes for storage and passing downstream for routing and processing; iv) a routing adjudication and processing sub-engine that may use a stored, pre-defined logical ruleset for data forwarding rules that determine when data should be forward and to which consumer based on geotemporal or other metadata parameters including formatting data into the receiving standard; v) a message queue that may offload the validated, routed, processed message onto the relevant service point for handoff to a transmission method; and vi) a transmission protocol and location necessary to reach the rules-defined data consumer in their native format.

The physical architecture of the aviation routing and processing engine, as described herein, rests on various core technical principles such as, but not limited to: i) an object-native, data structure based language, which defaults to immutable data structures, reducing the likelihood of bugs during data transformations and creating concise, maintainable data transforms that make it easier to use parallel processing as CPU load increases with data volumes; ii) use of full deployment automation, which supports rapid multi-node scaling and distribution of workload ensuring that the aviation routing and processing engine maintains performance as well as supporting quality and security through automated tests, checks, and validation of all code prior to deployment; and iii) real-time inline event monitoring, logging, and notification to continuously optimize performance and security while providing audit and debugging records in the event of a system malfunction. Other features of the physical instantiation of embodiments of the present disclosure include, but are not limited to: i) the use of multiple data transport modes to support native communications of data producers and consumers while optimizing for security and ii) performance and use of a message queuing approach to reduce the chance of dropping messages, provide an audit log for system events, and support maximized performance across multiple service points.

Another key aspect of embodiments of the present disclosure is the collection of performance data on both the data sources and producers, as well as the performance of the aviation routing and processing engine itself. This inline collection of performance data support delivery of service in a manner that complies with applicable standards but also allows for performance-based navigation and safety services and the ability to proactively and immediately alert data consumers when the overall system (including upstream sensors) is experiencing an outage or performance issue. Performance metrics for which data are collected and calculated inline may include, but are not limited to: i) processing time latency (the time differential from when a particular piece of data is requested to being generated); ii) technical latency (the actual latency from creation of the source data to delivery to its final recipient); iii) data and message integrity (for a given data source, does the message conform to the documented, expected message format and payload); iv) data and message completeness (of the potential data elements of the message (including non-required) how many are present); v) data and message frequency or refresh rate (are the observed messages conforming with the expected frequency of messages for a given service source based on underlying source performance); vi) data precision (what is the underlying quantified error in the source data of a particular data source); vii) data and message confidence (for a given expected error in and underlying source datum, how does the observed distribution of collected data vary from the expected distribution of quantified error); or viii) availability (for a given operational area, where would be expect to have service availability). The result of collecting and processing these metrics inline is that embodiments of the present disclosure have the ability to automatically self-report both i) failure of the aviation routing and processing engine to meet the required system performance for navigation and safety as defined in applicable rules, regulations, or standards, or ii) the event of any upstream data source violating its expected service level to conform to an overall system performance for navigation and safety. The result is that the aviation routing and processing engine may be configured to differentially quantify and publish service levels geotemporally, allowing for graceful degradation of service in the event of a sensor or system failure of a contributing system in the field.

Table 1 below lists illustrative examples of aviation data and how sharing these data between domains by the aviation routing and processing engine is useful, specifically in demonstrating live integration of UAS and General Aviation operations in a shared airspace.

TABLE 1

| Information Category | Example | Sharing Mechanism | How Information Is Used |
|---|---|---|---|
| Position Data | Lat/Long/Alt/Bearing for all aircraft | ADS-B radiofrequency message via GDL-90 or JSON using ASTM UTM F3442 specified fields (WGS 84 Lat & Long;; Altitude) | Information is processed to support awareness sharing and alerting via avionics or ground control software |
| Operational Intent | e.g., Flight Plan trajectory, operating volume | JSON using ASTM UTM F3442 specified fields (WGS 84 Lat & Long vertices of polygon; UTC Start and End time; Upper and Lower Altitude) | In conjunction with alerting rules, provides additional intent/heading data to support pilot actions and/or conflict avoidance via avionics or ground control software |
| National Air Space (NAS) configuration | Procedures, routes, entry/exit points, obstructions, temporary flight restrictions, etc. | KML XML polygons or JSON using ASTM UTM F3442 specified fields (WGS 84 Lat & Long vertices of polygon; UTC Start and End time; Upper and Lower Altitude) | Provides temporary information that can be included in NOTAMs and supplement to alert pilots |

Based on the information types described above, each of the classes of information described in Table 2 below can be provided as a specific and unique datum-allowing data consumer systems to present and filter data in the most natively intuitive way and allowing system participants to see data in a manner native to their domain to form their own assessment/judgement using available data. Filtering and forwarding rules are not intended to anticipate use of information, but rather to prevent information overload for the participating pilots or system overload of existing information sharing systems. Table 2 below describes classes of information sharing, what UAS data is used to generate the class, how it is shared and with whom for what purpose.

TABLE 2

| Item | Information Class | Processed from | Provided to/via | Purpose |
|---|---|---|---|---|
| 1 | NAS Configuration | UAS UTM Constraint/GA Airport or KML XML file | Crewed Pilots via NOTAMS, Supplement, EFB | Provide general situational awareness for planning, compliance, and alertness |
| 2 | NAS Configuration | UAS UTM Constraint/GA Airport or KML XML file | UAS via UTM USS-GCS | Provide general situational awareness for planning, complianc, and alertness |
| 3 | Position | UAS UTM Telemetry Position | Crewed Pilots via ADS-B Out including position data | Provide warning for situational awareness based on alerting rules |
| 4 | Position | UAS UTM Telemetry Position | Crewed Pilots via radio (CTAF-Unicom, AWOS) as area broadcast | Provide warning for situational awareness based on alerting rules |
| 5 | Position | ADS-B out message Telemetry Position | UAS via UTM USS-GCS | Provide warning for situational awareness based on alerting rules |

TABLE 2-continued

| Item | Information Class | Processed from | Provided to/via | Purpose |
|---|---|---|---|---|
| 6 | Intent | UAS UTM Intent, UAS UTM Telemetry Position | Crewed Pilots via ADS-B Out including position, heading, and speed data | Provide assistance if modifying flight path for collision avoidance |
| 7 | Intent | Flight Intent, UAS UTM Telemetry Position | UAS via UTM USS-GCS | Provide assistance if modifying flight path for collision avoidance |

The aviation routing and processing engine may make use of filtering and forwarding rules intended to identify specific scenarios where cross-domain information sharing is relevant to domain-specific aviation participants to support situational awareness and potential modification of flight intent to avoid risk of conflict. Again, the intent of these rules is not to anticipate pilot use of information, but rather to prevent information overload for the non-participating pilot or system overload of existing information sharing systems, and to present this information through existing systems in a manner native and familiar to the operator or pilot.

Table 3 below details a set of example data processing and routing rules that can be applied to the information classes above to generate the required message sets to the appropriate domain-specific participant when appropriate. These examples are not complete or all-encompassing but rather represent examples of information sharing that may be used to alert participants in a given scenario, providing information to operators/pilots in a manner that improves situational awareness, provides information which may be critical or useful for decision making, is provided in a timely manner, and does not provide redundant or unnecessary information. These rules are examples designed to support the following geotemporal scenarios, which may be encountered at a general aviation airport in a medium density traffic scenario: i) situational awareness at lower altitudes when participating and non-participating craft are operating in the vicinity of one another; ii) situational awareness when participating aircraft are operating in proximity of a general aviation airport under pre-defined, stored information sharing conditions (3D volume, time, altitude); and iii) proximity to other features, as identified under pre-defined, store rules.

TABLE 3

| Rule Name/Description | Uses Which Data | Creates Alert Type | Example Rule Parameters |
|---|---|---|---|
| Air-to-Air Proximity Alert: alerts crewed GA pilot of UAS proximity enroute at altitude (simple proximity) | UAS Position, ADS-B In, Configuration/ Constraint | ADS-B Out Proximity alert with position of UAS | Both aircraft within constraint<br>Both aircraft within defined notification proximity limit<br>UAS above altitude notification threshold |
| Air-to-Air Proximity Heading Alert: alerts crewed GA pilot of proximity to UAS en route at altitude including heading and speed (adding heading to proximity) | UAS Position, ADS-B In, Configuration/ Constraint, Operational Intent | Adds heading to ADS-B Out notification | Availability of UAS or GA operational intent data |
| Air-to-Air Proximity Alert: alerts UAS pilot of GA proximity to UAS en route at altitude including GA heading (proximity and heading/ speed) | ADS-B In, UAS Position Configuration/ Constraint | Position notification insertion into GCS via USS-UTM | Both aircraft within constraint<br>GA aircraft within speed-determined proximity limit<br>GA aircraft below altitude threshold |
| Airport Approach-Departure Proximity Alert: alerts crewed GA pilot of UAS proximity during departure, climb, or approach phase of flight within proximity of GA airport and defined boundary (event and configuration determined proximity-is the information relevant) | UAS Position, ADS-B In, Configuration/ Constraint | ADS-B Out Proximity alert with position of UAS and Secondary radio broadcast on AWOS and/or CTAF | Detected GA aircraft within defined radius of airport<br>Detected GA below altitude threshold<br>Detected UAS within UAS notification boundary (different from radius boundary)<br>UAS above altitude notification threshold |
| Feature Proximity Alert: alerts crewed GA pilot of UAS proximity during any phase of flight within proximity of feature defined boundaries (for non airport features where we may wish notification because of density or difficult procedures) | UAS Position, ADS-B In, Configuration/ Constraint | ADS-B Out Proximity alert with position of UAS | Detected GA aircraft within defined radius of feature<br>Detected GA below altitude threshold<br>Detected UAS within UAS notification boundary (different from radius boundary)<br>UAS above altitude notification threshold |

TABLE 3-continued

| Rule Name/Description | Uses Which Data | Creates Alert Type | Example Rule Parameters |
|---|---|---|---|
| Configuration Notification | Configuration/ Constraint | NOTAM, Supplemental | Provide situational awareness through EFB and at pre-flight phase |

Given the information classes, data sources and data consumers for given domain-specific participants, domain-native systems and transmission methods, and use of domain-specific transmission methods, the aviation routing and processing engine can be configured using stored, pre-defined processing and routing rule sets that result in very specific cross-domain information flows that leverage the existing domain-native systems and protocols while providing specific information to specific participants at a specific time. Embodiments herein may provide a pre-defined constraint area, the domain-specific data source and data, pre-defined conditions for when data are transmitted and to whom, how these data are physically transmitted from the domain-specific source to the aviation routing and processing engine, which processing rules are applied to which data upon receipt, the domain-specific transmission method to the recipient, and the summary of each cross-domain processed datum receiving by the data consumer and on which domain-native system.

As described above, the aviation routing and processing engine includes inline data service and system monitoring capabilities that report on key metrics of data services performance for each data source. Not only is this critical to ensuring a reliable overall system and the ability to meet system performance standards and FAA requirements, it also allows the aviation routing and processing engine to provide critical metadata for any given data source within the overall multi-domain NAS. This metadata can be used by data consumers, in the context of FAA regulations and industry standards, to assess the overall performance level of information sharing for a given geotemporal volume in the NAS, and this aggregated metadata can then be applied to performance-based navigation standards. An example of a performance-based navigation standard is the Instrument Flight Rules (IFR) approach procedure (a procedure that allows pilots to land at an airport with very low visibility) that may require the airport to have both an Automated Weather Observation System (AWOS) and an Instrument Landing System (ILS). The airport may be required to provide operational status of these systems, and the pilot may be required to ascertain status before commencing an instrument approach procedures (IAP) approach-if the systems are not performing, an IAP is not permitted. By virtue of providing data source performance metadata in conjunction with actual cross-domain data processing and routing, the aviation routing and processing engine allows for the dynamic application of these performance metadata in the context FAA performance based navigation regulations by domain-native systems (avionics, USS, PSU, GCS) to define, in real-time, the navigational and flight procedures that are safe and allowable for any given geotemporal volume, at any time, as described by embodiments herein, by clearly identifying if a given cross-domain data source is within required performance boundaries.

As such, the systems and methods of the present disclosure provide various benefits to aviation. Some benefits are described in Table 4, below, and include the ability to improve safety, such as maintaining separation in high density environments; the ability to improve pilot performance, by providing the right information at the right time; and the ability to maintain overall NAS system performance by using information processing and routing rules to only exchange necessary information, thereby not overloading existing and future aviation communications and avionics systems.

TABLE 4

| Benefit | Description | Measurement of Benefit |
|---|---|---|
| Maintenance of Separation | 3D separation between all objects in system as of position measurement time minimizes risk of midair collision | Quantitative: Mean, Median, Standard Deviation and Variance of separation values measured in feet |
| Benefit | Description | Measurement of Benefit |
| Information Timeliness and Completeness | Ability to provide targeted notification information in a timely manner (e.g., with enough time for the pilot to process and react) and complete manner (e.g., the notification provides sufficient information to make a decision) | Quantitative: Mean, Median, Standard Deviation and Variance of latency from detection to notification and time-to-event in the event of loss of separation (e.g., warning time) Quantitative/Qualitative: Ratio of actionable to non-actionable alerts and correlation of each population to notification completeness (e.g., heading or heading, speed) |
| Reduce Network Loading | Use targeted notification to reduce the degree to which the notification overloads the network, maintaining the overall value of the network (e.g., ADS-B) | Quantitative: Minimize proportional contribution of new notifications relative to existing system notifications; provide notification within the defined parameters |

TABLE 4-continued

| Benefit | Description | Measurement of Benefit |
|---|---|---|
| Reduce Pilot Information Loading | Use targeted notification to prevent information overloading the ability of the pilot to process the information and make decisions | Quantitative/Qualitative: Test pilot cognitive response while reducing threshold for alerting during simulations |
| Render Pilot Friendly | Present information to the pilot through existing interfaces, rendering is more useable/ useful. | Qualitative: Did the pilot use the information? What was their reaction? Would the pilot feel as safe if the information were taken away? |
| Increase NAS throughput | More timely, conspicuous information allows for higher density of operations, allowing for greater NAS throughput | Quantitative: Increase in relative number of operations for a given geotemporal service volume |

Referring now to FIG. 1, an embodiment of transportation information exchange system 100 is illustrated. In the illustrated embodiment, the transportation information exchange system 100 may include one or more general aviation aircraft 103 or one or more unmanned vehicles 105 provided in an environment 102. The environment 102 may be any indoor or outdoor space that may be contiguous or non-contiguous. The environment 102 may be defined by geofencing techniques that may include specific geographic coordinates such as latitude, longitude, or altitude, or operate within a range defined by a wireless communication signal. The general aviation aircraft 103 may include any conventional piloted aircraft as discussed herein. However, in other embodiments for general transportation systems, the conventional piloted aircraft may be any manned vehicle such as an automobile, watercraft, farm equipment, or the like.

The unmanned vehicle 105 may be implemented by any type of drone, such as an unmanned aerial vehicle (UAV). In alternative embodiments, a robot, an unmanned ground vehicle (e.g., a car, a truck, a tractor, military equipment, construction equipment, etc.), an unmanned amphibious vehicle (e.g., a boat, a submersible, a hovercraft, etc.), or other vehicular devices may be employed. In the illustrated examples of the present disclosure, the unmanned vehicle 105 is depicted as a UAV and may include a flight control unit 108 and a payload unit 110. For example, the flight control unit 108 of the unmanned vehicle 105 may include any appropriate avionics, control actuators, or other equipment to fly the UAV. The payload unit 110 of the unmanned vehicle 105 may include any equipment implementing features supported by the given UAV. For example, the payload unit 110 may include one or more sensors, such as one or more cameras or other imaging sensors 110*a*, one or more environmental sensors (e.g., such as one or more temperature sensors, pressure sensors, humidity sensors, gas sensors, altitude sensors, location sensors and the like) or any other sensor. Additionally or alternatively, an example payload unit 110 for the unmanned vehicle 105 may include tools, actuators, manipulators, etc., capable of manipulating (e.g., touching, grasping, delivering, measuring, etc.) objects. For example, as illustrated in FIG. 1, the UAV may include a robotic arm 110*b* that is configured to deploy the one or more sensors include on the robotic arm 110*b*. Additionally or alternatively, an example payload unit 110 for the unmanned vehicle 105 may include a portable base station, signal booster, signal repeater, etc., to provide network coverage to an area.

The general aviation aircraft 103 or the unmanned vehicle 105 may include communication units having one or more transceivers to enable the unmanned vehicle 105 to communicate with a remote monitor 120, a transportation information exchange service platform 130, ground control stations 145, third party computer systems 150, or sensors 155 (e.g., weather sensors, radar, proximity sensors, or any other sensor discussed herein or that would be apparent to one of skill in the art in possession of the present disclosure) via a communication network 135, or any other computing devices (e.g., other unmanned vehicles, sensors, a docking station, etc.) in the environment 102 that would be apparent to one of skill in the art in possession of the present disclosure. Accordingly, and as disclosed in further detail below, the remote monitor 120 may be in communication with the unmanned vehicle 105 directly or indirectly. As used herein, the phrase "in communication," including variances thereof, encompasses direct communication or indirect communication through one or more intermediary components and does not require direct physical (e.g., wired or wireless) communication or constant communication, but rather additionally includes selective communication at periodic or aperiodic intervals, as well as one-time events.

For example, the general aviation aircraft 103 or the unmanned vehicle 105 in the transportation information exchange system 100 of FIG. 1 include first (e.g., long-range) transceiver(s) to permit the general aviation aircraft 103 or the unmanned vehicle 105 to communicate with the communication network 135. The communication network 135 may be implemented by an example mobile cellular network such as a radio access network (RAN) that includes a core network and one or more base stations 140. As such, the RAN may include a long-term evolution (LTE) network or other third generation (3G), fourth generation (4G) wireless network, or fifth-generation (5G) wireless network. However, in some examples, the communication network 135 may be additionally or alternatively be implemented by one or more other communication networks, such as, but not limited to, a satellite communication network, a microwave radio network, or other communication networks that are discussed herein or that would be apparent to one of skill in the art in possession of the present disclosure.

The general aviation aircraft 103 or the unmanned vehicle 105 additionally or alternatively may include second (e.g., short-range) transceiver(s) to permit the general aviation aircraft 103 or the unmanned vehicle 105 to communicate with sensors, docking stations, other unmanned vehicles or manned aircraft, the remote monitor or other computing devices in the environment 102. In the illustrated example of FIG. 1, such second transceivers are implemented by a type of transceiver supporting short-range wireless networking. For example, such second transceivers may be implemented by Wi-Fi transceivers, Bluetooth® transceivers, infrared (IR) transceiver, and other transceivers that are configured to allow the general aviation aircraft 103 or the unmanned vehicle 105 to intercommunicate via an ad-hoc or other wireless network.

The transportation information exchange system 100 also includes or may be used in connection with a remote monitor 120. The remote monitor 120 may be provided by a desktop computing system, a laptop/notebook computing system, a tablet computing system, a mobile phone, a set-top box, a remote control, a wearable device, and implantable device, or other remote monitor for controlling the unmanned vehicle 105. However, in other embodiments, the unmanned vehicle 105 may be autonomous or semi-autonomous. The remote monitor 120 may be responsible for managing the unmanned vehicle 105 deployed in the environment 102. For example, the remote monitor 120 may communicate indirectly through the communication network 135 or directly to locate the unmanned vehicle 105 in the environment 102, identify the unmanned vehicle 105 in the environment 102, ascertain capabilities of the unmanned vehicle 105 in the environment 102, monitor the operating status of the unmanned vehicle 105 in the environment 102, receive sensor data provided by the unmanned vehicle 105 in the environment 102, provide instructions to the unmanned vehicle 105, or provide other functionality.

The transportation information exchange system 100 also includes or may be in connection with a transportation information exchange service platform 130 that may include the aviation routing and processing engine discussed above. For example, the transportation information exchange service platform 130 may include one or more server devices, storage systems, cloud computing systems, or other computing devices (e.g., desktop computing device(s), laptop/notebook computing device(s), tablet computing device(s), mobile phone(s), etc.). As discussed in further detail below, the transportation information exchange service platform 130 may be configured to provide the aviation routing and processing engine along with routing and processing rules, data, message queues, and data validation instruction or other data and instructions that would be apparent to one of skill in the art in possession of the present disclosure and discussed in more detail herein. While a specific transportation information exchange system 100 is illustrated in FIG. 1, one of skill in the art in possession of the present disclosure will recognize that other components and configurations are possible, and thus will fall under the scope of the present disclosure. For example, the system may include many more unmanned vehicles or general aviation aircraft (e.g., 2, 5, 10, 100, 1000, or more) or many other remote monitors, sensors, ground control stations, or third-party systems (e.g., 2, 5, 10, 100, 1000, or more) in the environment 102 and the system 100 may include many other separate environments 102 or many more communication methods/modes.

Figure 2:
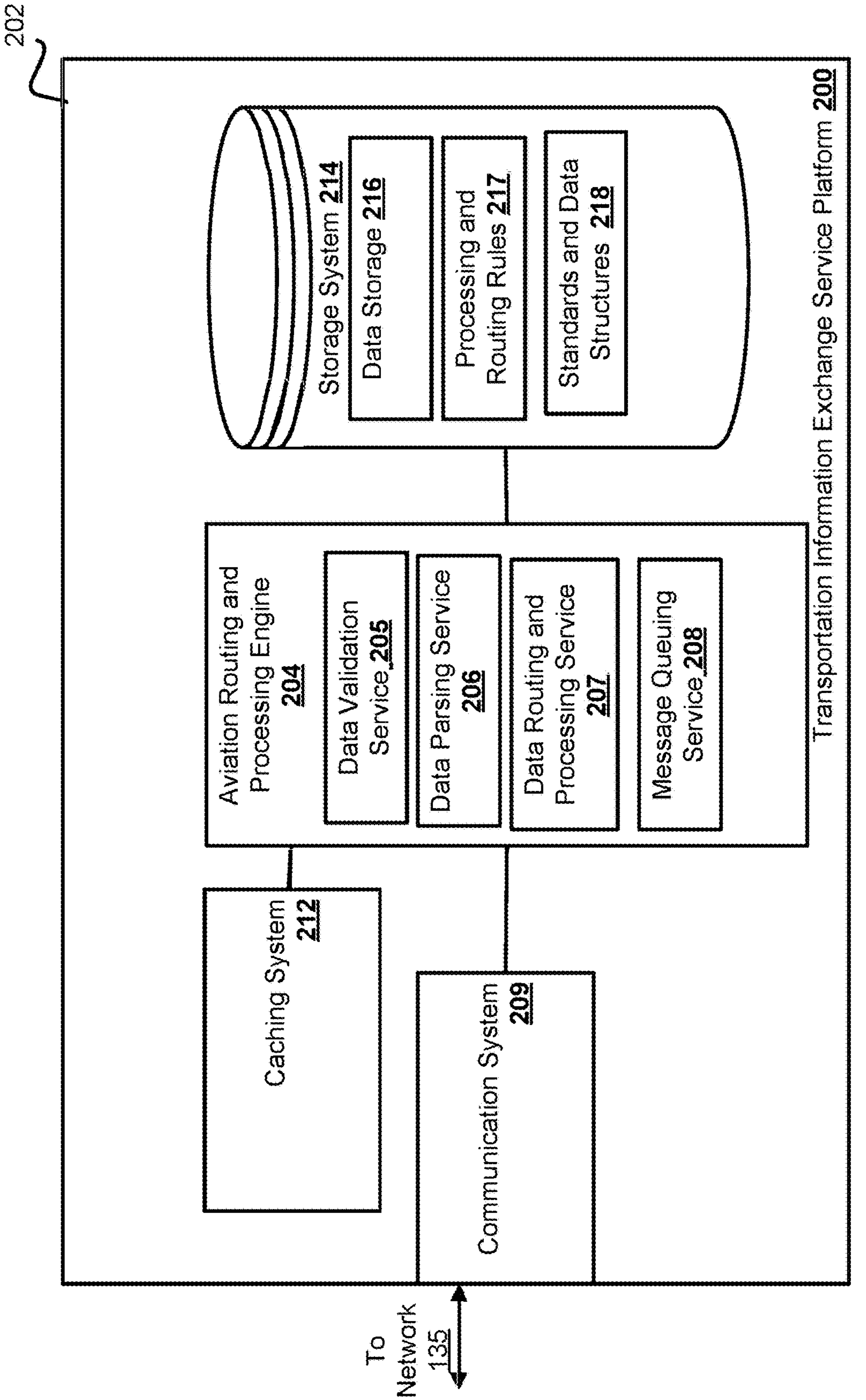
FIG. 2 is a schematic view illustrating an embodiment of a transportation information exchange service platform used in the transportation information exchange system of FIG. 1, in accordance with some embodiments of the present disclosure.

FIG. 2 illustrates an embodiment of a transportation information exchange service platform 200 that may be the transportation information exchange service platform 130 discussed above with reference to FIG. 1. In the illustrated embodiment, the transportation information exchange service platform 200 includes a chassis 202 that houses the components of the transportation information exchange service platform 200, only some of which are illustrated in FIG. 2. For example, the chassis 202 may house a processing system (not illustrated) and a non-transitory memory system (not illustrated) that includes instructions that, when executed by the processing system, cause the processing system to provide an aviation routing and processing engine 204 that is configured to perform the functions of the aviation routing and processing engines or the transportation information exchange service platforms discussed below. In the specific example illustrated in FIG. 2, the aviation routing and processing engine 204 may include a validation service 205 that is configured to perform the functions of the data validation services discussed herein. In various embodiments, the validation service 205 may ingest data provided by data sources and validates ingested data against a pre-defined data structure as defined in a data standard or vendor proprietary data documentation that then forwards validated data or reports erroneous data, or any other functionality discussed herein. The aviation routing and processing engine 204 may include a data parsing service 206 that is configured to perform the functions of the data processing services discussed below. In various embodiments, the data parsing service 206 may convert the received data into a generic set of attributes for storage and passing downstream for routing and processing, or any other functionality discussed herein. The aviation routing and processing engine 204 may also include a data routing and processing service 207 that is configured to perform the functions of the data routing and processing service discussed below. In various embodiments, the data routing and processing service 207 may use a stored, pre-defined logical ruleset for data forwarding rules that determine when data should be forward and to which consumer based on geotemporal or other metadata parameters including formatting data into the receiving standard or any other functionality discussed herein. The aviation routing and processing engine 204 may also include a message queuing service 208 that is configured to perform the functions of the message queuing service discussed below. In various embodiments, the message queuing service 208 may offload the validated, routed, processed message onto the right service point for handoff to the transmission protocol and location necessary to reach the rules-defined data consumer in their native formator, or may perform any other functionality discussed herein.

The chassis 202 may further house a caching system 212. As an example and not by way of limitation, to execute instructions, the aviation routing and processing engine 204 may retrieve (or fetch) instructions from an internal register, an internal cache, a memory, or storage system 214; decode and execute them; and then write one or more results to an internal register, an internal cache, memory, or storage system 214. In particular embodiments, the aviation routing and processing engine 204 may include one or more internal caches for data, instructions, or addresses. This disclosure contemplates a processor that provides the aviation routing and processing engine 204 to include the caching system 212 that may include any suitable number of any suitable internal caches, where appropriate. As an example and not by way of limitation, that caching system 212 may include one or more instruction caches, one or more data caches, and one or more translation lookaside buffers (TLBs). Instructions in the instruction caches may be copies of instructions in memory or storage system 214 and the instruction caches may speed up retrieval of those instructions by the aviation routing and processing engine 204. Data in the data caches may be copies of data in memory or storage system 214 (which may initially be retrieved via the network from an external data source) for instructions executing at the processor to operate on; the results of previous instructions executed at the processor for access by subsequent instructions executing at the processor, or for writing to memory, or the storage system 214; or other suitable database. The data caches may speed up read or write operations by the aviation routing and processing engine 204. The TLBs may speed up virtual-address translations for the aviation routing and processing engine 204. In particular embodiments, the processor providing the aviation routing and processing engine 204 may include one or more internal registers for data, instructions, or addresses. Depending on the embodiment, the processor may include any suitable number of any suitable internal registers, where appropriate. Where appropriate, the processor may include one or more arithmetic logic units (ALUs); be a multi-core processor; include one or more processors; or any other suitable processor. In various embodiments, of the present disclosure, the caching system 212 may cache data from data sources (e.g., remote and locally) or routing rules based on a variety of conditions such as, amount of data, demand of the data or routing rule, or other conditions that would be apparent to one of skill in the art in possession of the present disclosure.

The chassis 202 may further house a communication system 209 that is coupled to the aviation routing and processing engine 204 (e.g., via a coupling between the communication system 209 and the processing system) and that is configured to provide for communication through the communication network 135 as detailed below. The chassis 202 may also house a storage system 214 that is coupled to the aviation routing and processing engine 204 through the processing system and that is configured to store the rules or other data utilized by the aviation routing and processing engine 204 to provide the functionality discussed below. The storage system 214 may store one or more data storage 216 for received data, processing and routing rules 217 that includes one or more routing rules that may be used to route the data from the data storage 216 to the appropriate consumer in the appropriate standards or data structure 218 when certain conditions are met. While a specific transportation information exchange service platform 200 has been illustrated, one of skill in the art in possession of the present disclosure will recognize that other transportation information exchange service platforms (or other devices operating according to the teachings of the present disclosure in a manner similar to that described below for the transportation information exchange service platform 200) may include a variety of components and/or component configurations for providing conventional computing device functionality, as well as the functionality discussed below, while remaining within the scope of the present disclosure as well.

Figure 3:
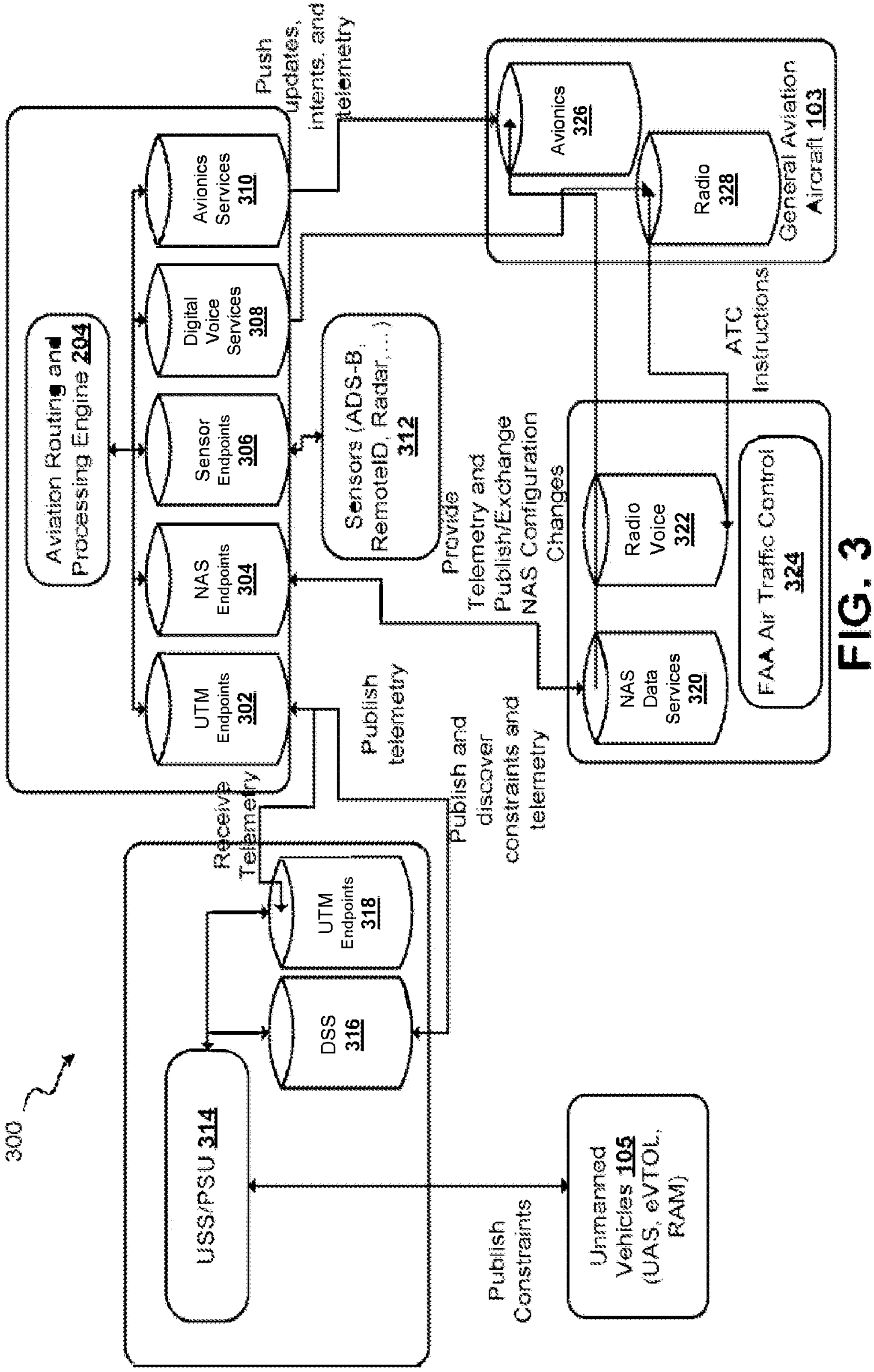
FIG. 3 illustrates a conceptual architecture of the transportation information exchange system of FIG. 1 and the transportation information exchange service platform of FIG. 2 in accordance with some embodiments of the present disclosure.

FIG. 3 illustrates an example conceptual architecture 300 of the transportation information exchange system 100 of FIG. 1 and the transportation information exchange service platform 200 of FIG. 2. The aviation routing and processing engine 204 performs the cross-domain collection, validation, processing, and routing in the conceptual architecture 300. As described herein the aviation routing and processing engine 204 is a collection of logical data manipulation modules that each perform a key function in cross-domain information exchange according to a pre-programmed set of standards and rules. For example, the aviation routing and processing engine 204 may be coupled with a plurality of endpoints and services such as, but not limited to, UTM endpoints 302, NAS endpoints 304, sensor endpoints 306, digital voice services 308, avionics services 310, or any other endpoint or service that would be apparent to one of skill in the art in possession of the present disclosure. The UTM endpoints 302 may be coupled with a USS network and PSU network 314 via UTM endpoints 318 and a discovery and synchronization service (DSS) 316. The USS network and PSU network 314 may publish constraints to the unmanned vehicles 105 (e.g., an UAS, an eVTOL, a RAM or the like). The DSS 316 and UTM endpoints 302 and 318 may publish telemetry data to and receive telemetry data from the aviation routing and processing engine 204 as well as publish or discover other constraints and telemetry data.

In various embodiments, the NAS endpoints 304 may be in communication with a NAS data service 320 that is in communication with FAA air traffic control 324 such that NAS configuration changes may be published or exchanged between the aviation routing and processing engine 204 and the NAS data services 320. In various embodiments, sensor endpoints 306 may be in communication with sensors 312 such as ADS-B, RemoteID, radar, or other sensors that would be apparent to one of skill in the art. The sensor endpoints 306 may receive or retrieve sensor data for the aviation routing and processing engine 204. The digital voice services 308 may interact with a radio 328 of a general aviation aircraft 203 to provide relevant information to the pilot or to obtain air traffic control instructions from radio voice 322 of the FAA air traffic control 324. In various embodiments, avionics services 310 may push updates, intents, and telemetry to an avionics unit 326 onboard the GA aircraft as well as receive any data being offloaded by those avionics units. These data sources and data consumers may have different communication standards and formats in providing and consuming data. The aviation routing and processing engine 204 may provide the data routing and processing of this data as discussed herein to accommodate the different data formats such that information can be exchanged between the different actors operating and managing an airspace without modifying current systems.

Figure 4:
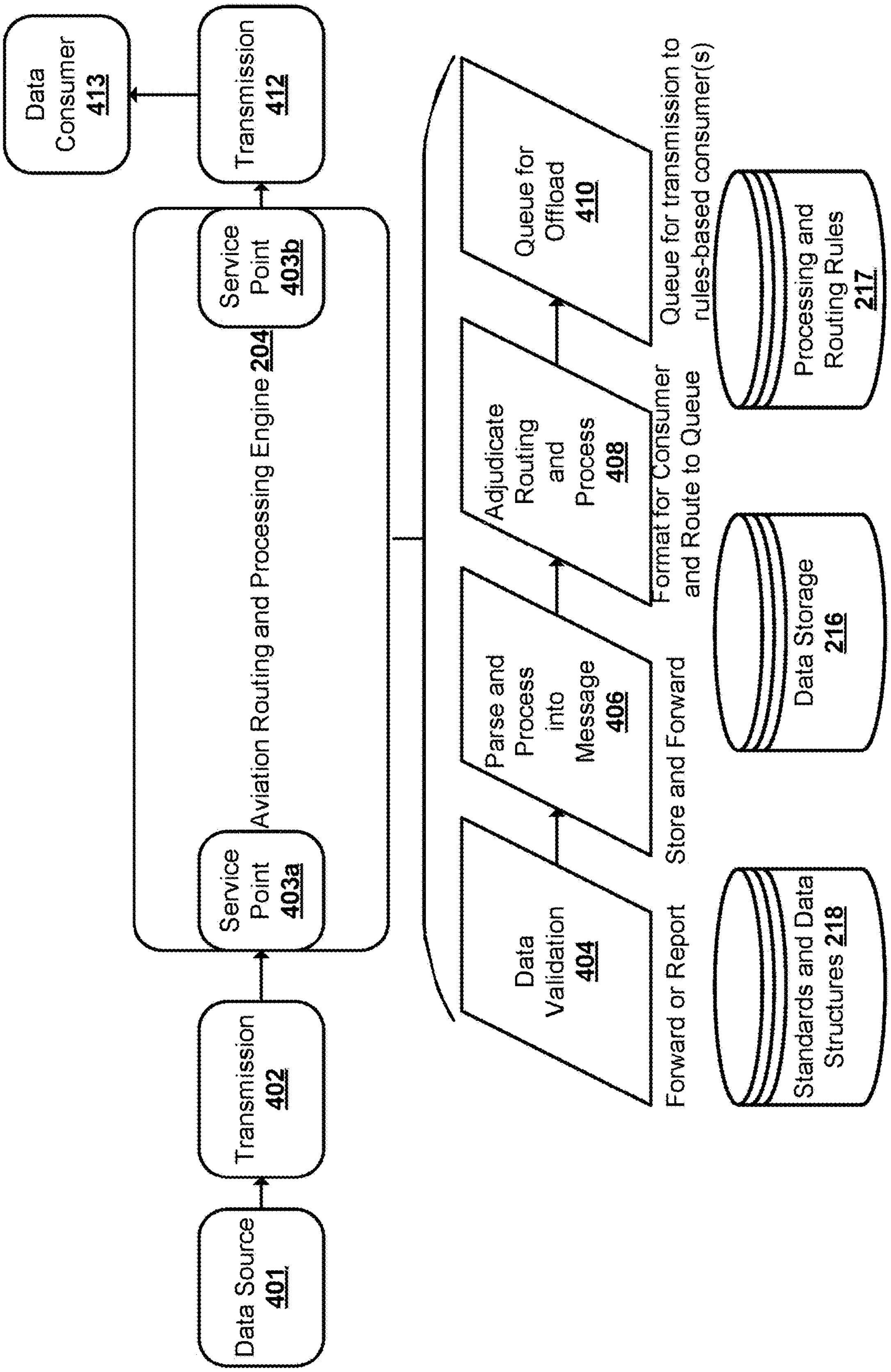
FIG. 4 is a block diagram of the data routing and processing workflow performed by an aviation routing and processing engine of the transportation information exchange service platform of FIG. 2, in accordance with some embodiments of the present disclosure.

FIG. 4 illustrates a block diagram of the data routing and processing workflow performed by the aviation routing and processing engine 204. As illustrated by FIG. 4, a data source 401 (e.g., avionics, transponder, sensor, or other source) may transmit 402 data via a transmission medium (e.g., TCP/IP, a radiofrequency link, or other transmission medium). The ingress of a data source to a service point **403*a* on the aviation routing and processing engine 204 may be through a defined transmission or protocol. The initial ingestion of data into the aviation routing and processing engine 204 may be through the validation service 205/404 that validates a received message against a pre-defined data structure as defined in a data standard or vendor proprietary data documentation provided in the stored standards and data structures 218. The validation service 205/404 may then store and forward validated data or reports erroneous data. The data parsing service 206/406 may receive forwarded, validated data and may convert the received data into a generic set of attributes for storage in data storage 216 and passing downstream for routing and processing. The data routing and processing service 207/408 may use a stored, pre-defined logical ruleset for data forwarding rules (e.g., processing and routing rules 217) that determine what data should be forwarded, when data should be forward, and to which consumer based on geotemporal, other metadata parameters, or other condition and also may format data into the receiving standard used by the consumer. The message queuing service 208/410 may offload the validated, routed, processed message onto the right service point 403*a* for handoff to the transmission protocol 412 and location necessary to reach the rules-defined data consumer 413** in their native format.

Figure 5:
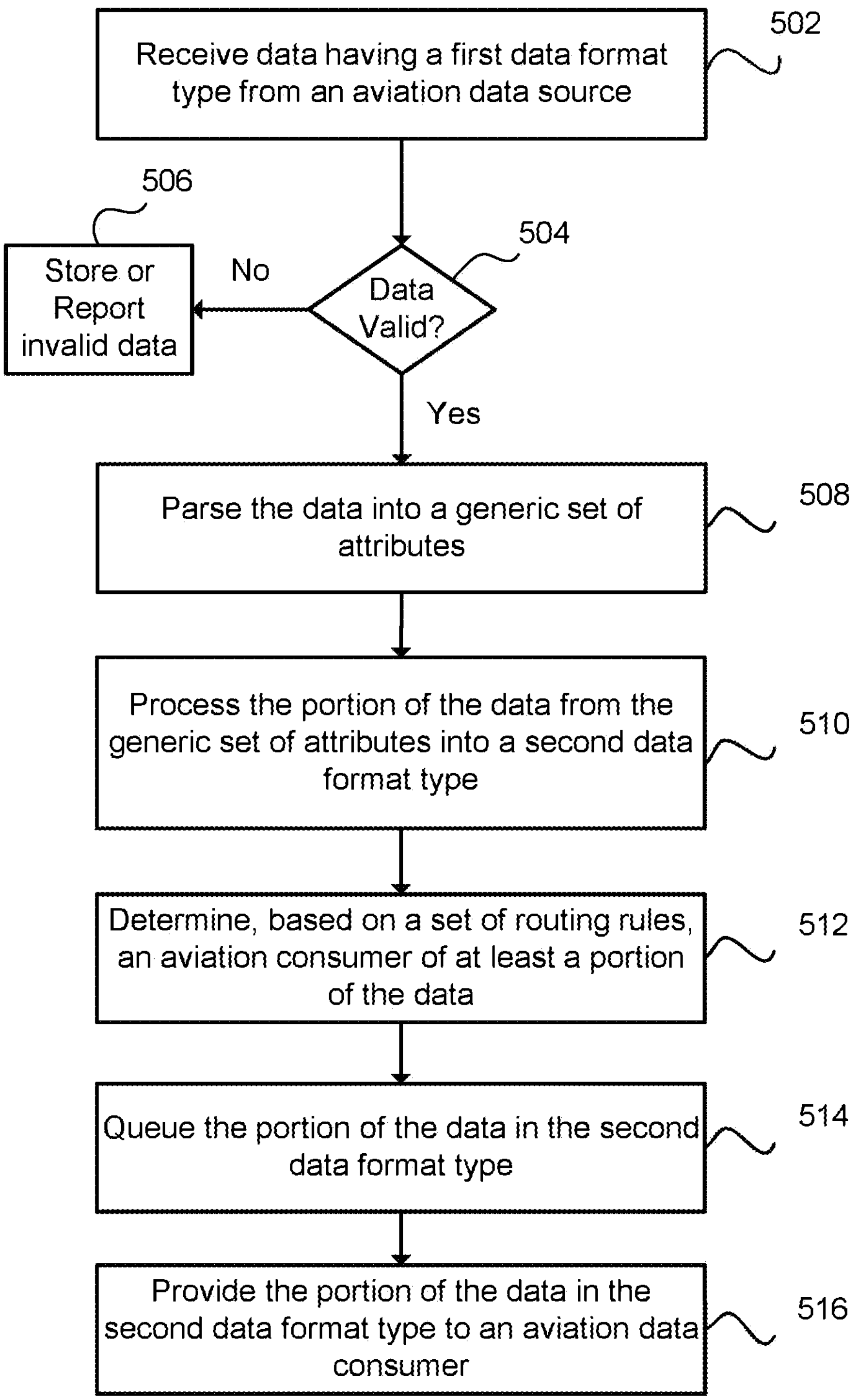
FIG. 5 is a flowchart illustrating an embodiment of a method of transportation information exchange, in accordance with some embodiments of the present disclosure.

FIG. 5 depicts an embodiment of a method 500 of transportation information exchange, which in some embodiments may be implemented with at least some of the components of FIGS. 1, 2, 3 and 4 discussed above. As discussed below, some embodiments make technological improvements to aviation information exchange between various actors in an aviation environment. The method 500 is described as being performed by the aviation routing and processing engine 204 included on the transportation information exchange service platform 130/200. Furthermore, it is contemplated that other computer systems in the transportation information exchange system 100 may include some or all the functionality of the aviation routing and processing engine 204. As such, some or all of the steps of the method 500 may be performed by other actors in the transportation information exchange system 100 and still fall under the scope of the present disclosure. Furthermore, and as mentioned above, the transportation information exchange service platform 130/200 may include one or more processors or one or more servers, and thus the method 500 may be distributed across the those one or more processors or the one or more servers.

The method 500 begins at operation 502 where data having a first data format type is received from an aviation data source. In an embodiment, at operation 502, the aviation routing and processing engine 204 may receive, via the communication system 209, a message that includes various aviation data from an aviation data source. The data may be received at a service point 403*a* of FIG. 4 that may include any of the services/endpoints 302-310 of FIG. 3. In various embodiments, the data source may be any of the general aviation aircraft 103, the unmanned vehicle 105, the sensors 155, the ground control station 145, the third-party system 150, or other sources. Specifically, and with reference to FIG. 9, a data source may include UTM, FAA, FAA ATC, UAS, general aviation aircraft, RAM/UAM/eVTOL, or any other data source that may be apparent to one of skill in the art in possession of the present disclosure. In various embodiments, the data package may include a UTM constraint, an FAA NOTAM, a FAA ATC-temporary flight restriction (TFR), a UAS-position, a general aviation-ADS-B position, a RAM/UAM-ADS-B position, or other data packages that would be apparent to one in the art in possession of the present disclosure. The data may be received via various transmission methods. For example, receiving endpoints exposed through a firewall and a load balancer may receive domain-specific data source transmitted messages including a REST HTTP TCP/IP interface, an HTTP TCP/IP interface, a TCP/IP transmission of binary data, a radiofrequency link, or a direct over-the-wire transfer of binary data. The firewall and load balancer may support controlled, authenticated data ingress and egress access points that are exposed through the controlled network boundary to authenticated users. Specifically, and with reference to FIG. 9, a transmission method may include a DSS REST API subscription for NAS or UTM constraint messages and FAA services endpoints over TCP/IP. In other examples, a local ADS-B receiver may be used for receiving ADS-B messages. Other messages may include RemoteID messages, UTM intent, constraint, and telemetry messages, FIS-B messages, USS-GCS, radio communications (e.g., common traffic advisory frequency (CTAF)-Unicorn, AWOS, or the like), automatic terminal information service (ATIS), charts, or any other messages that would be apparent to one of skill in the art in possession of the present disclosure. The data messages may be created according to standards-based aviation interface (e.g., ASTM, F3442/F3442M-23, RTCA DO-267A, RTCA DO-282B, RTCA DO-358B, Garmin GDL-90, geoJSON, and others), raw binary data from sensors, or text-based standard or vendor proprietary formats from sensors or other formats types that would be apparent to one of skill in the art in possession of the present disclosure.

The method 500 may proceed to decision operation 504 where it is determined whether the data message received is valid. In an embodiment, at decision operation 504, the validation service 205/404 of the aviation routing and processing engine 204 may validate a received data message. The validation service 205 may validate the message against a pre-defined structure as defined in a data standard or vendor proprietary data documentation. For example, the validation service 205 may access domain-specific data standards and structures from the standards and data structure 218 database. The standards and structures may include RTCA DO-267A, RTCA DO-282B, RTCA DO-358B, and Garmin GDL-90 messages supporting receipt, decoding and transmission of ADS-B and FIS-B messages; ASTM F3442/F3442M-23 supporting receipt, decoding and transmission of UTM intent, constraint, and telemetry messages; ASTM F3411 supporting receipt, decoding and transmission of RemoteID messages; geoJSON, keyhole markup language (KML), and keyhole markup language zipped (KMZ) standards for storage and transmission of geospatial data, or other standards or structures that would be apparent to one of skill in the art in possession of the present disclosure. The validation service 205 may validate data messages received inline in real time.

If, at decision operation 504, the validation fails, then the method 500 may proceed to operation 506 where a record of the failing validation may be made and stored in the data storage 216 or in some embodiments, reported to a data consumer or a system administrator or other interested party that would be apparent to one of skill in the art in possession of the present disclosure. However, if, at decision operation 504, the data message is validated, the validation service 205 may forward the data message and data to a data parsing service 206/406. The validation service 205 may mark the data as validated before forwarding.

The method 500 may then proceed to operation 508 where the data is parsed into a generic set of attributes. In an embodiment, at operation 508, the data parsing service 206 may parse the data received. For example, the data parsing service 206 may convert the received data into a generic set of attributes for storage in the data storage 216 and passing downstream for routing and processing at a later time or in real time. The data parsing service 206 may use the pre-defined data structures and standards to extract the data and store the data in a format for storage or as an intermediary format. In some embodiments, the generic attributes may be cached in the caching system 212 for attributes that are used frequently or updated frequently while less frequent attributes are stored in the data storage 216.

Figure 9:
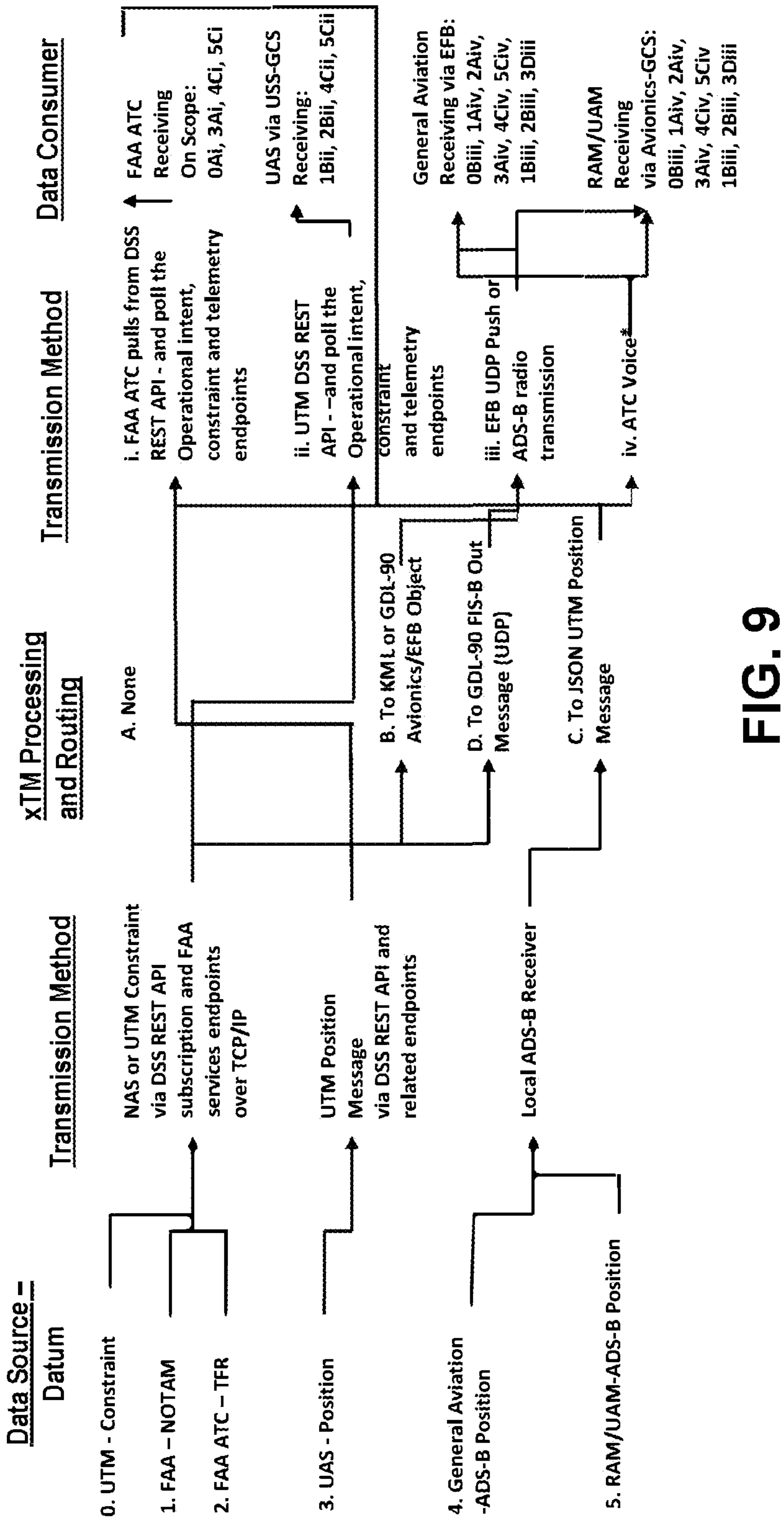
FIG. 9 illustrates an example workflow of the method of FIG. 5, in accordance with some embodiments of the present disclosure.

The method 500 may then proceed to operation 510 where data is processed according to predefined processing and routing rules. In an embodiment, at operation 510, the data routing and processing service 207/408 may process the validated, parsed data. Processing may include transforms on specific data or attributes to convert units of measurement. In various embodiments, processing may include transforms on specific data or attributes to create additional data required for a data consumer system. In various embodiments, processing may include conversion of the data structure from one domain-specific standard or structure to another domain-specific standard or structure given the stored, pre-defined processing and routing rules 217 using stored, pre-defined data standards and structures 218. Such examples of processing and routing rules 217 may include the processing and routing rules described above in Table 3, above. The processing and routing rules 217 may include conditions for providing and transforming data and conditions regarding which data consumers are to receive the data and when. With reference to FIG. 9, some data may be processed as a KML or GDL-90 avionics/EFB object, a GDL-90 FIS-B out Message (UDP), to a JSON UTM position message, any messages described above in Table 2 or Table 3, or any other format that would be apparent to one of skill in the art in possession of the present disclosure.

The method 500 may proceed to operation 512 where an aviation data consumer is determined for at least a portion of the data based on a set of routing rules. In an embodiment, at operation 512, the data routing and processing service 207/408 may determine an aviation consumer for at least a portion of the data. In various embodiments, the data routing and processing service 207/408 may apply stored, pre-defined processing and routing rules 217 to route processed data to a given distribution queue. For example, the data routing and processing service 207/408 may use stored, pre-defined processing and routing rules to adjudicate the domain-specific data to determine which domain-specific data consumers should receive the post-processed domain-specific data.

The method 500 may proceed to operation 514 where the data is queued. In an embodiment, at operation 514, the message queuing service 208/410 may queue the validated, parsed, processed, routed data. The message queuing service 208 may queue validated, processed, routed data for transmission to domain-specific data consumers using native protocols and transmission standards using transmission endpoints such as the service point 403*a* and endpoints/services 302-310 of FIG. 3. In some embodiments, the message queuing service 208 may have multiple distribution queues to serve multiple domain-specific data consumers. Furthermore, the queues may provide an audit trail of message delivery and be resistant to data loss.

The method 500 may proceed to operation 516 where the data in the second data format type may be provided to an aviation data consumer. In an embodiment, at operation 516, the queued data may be pushed or pulled from the queues and may be provided to aviation data consumers, which may be any of the data sources described above or any other computer device included in an aviation or transportation system that consumes data. However, some data sources may not be data consumers. For example, a sensor data source may not be a data consumer. As such, the aviation routing and processing engine 204 may support multiple transmission methods of the post-processed, queued data to multiple domain-specific consumers and may support multiple domain-native data transmission protocols and standards. The aviation routing and processing engine 204 may include transmission endpoints exposed through the firewall and load balancer for transmission of validated, processed, and routed data to external domain-specific data consumers including a REST HTTP TCP/IP interface, an HTTP TCP/IP interface, a TCP/IP transmission of binary data, a radiofrequency link, or a direct over-the-wire transfer of binary data. With reference to FIG. 9, the transmission method may include FAA ATC pulls from DSS REST API and poll the operational intent, constraint, and telemetry endpoints; UTM DSS REST API—and poll the operational intent, constraint, and telemetry endpoints; EFB UDP Push or ADS-B radio transmission, ATC voice or other transmission methods that would be apparent to one of skill in the art or discussed herein. Data consumers in FIG. 9 may include FAA ATC receiving on Scope, UAS via USS-GCS receiving, general aviation receiving via EFB, RAM/UAM receiving via Avionics-GCS, or other data consumers. The aviation data consumers may then consume the data independent of any instructions at the aviation routing and processing engine 204.

In various embodiments of the method 500, the aviation routing and processing engine 204 may collect performance data on both the data sources and producers, as well as the performance of the aviation routing and processing engine 204 itself. This inline collection of performance data support delivery of service in a manner that complies with applicable standards but also allows for performance-based navigation and safety services and the ability to proactively and immediately alert data consumers when the overall system (including upstream sensors) is experiencing an outage or performance issue. Performance metrics for which data are collected and calculated inline may include, but are not limited to: i) processing time latency (the time differential from when a particular piece of data is requested to being generated); ii) technical latency (the actual latency from creation of the source data to delivery to its final recipient); iii) data and message integrity (for a given data source, does the message conform to the documented, expected message format and payload); iv) data and message completeness (of the potential data elements of the message (including non-required) how many are present); v) data and message frequency or refresh rate (are the observed messages conforming with the expected frequency of messages for a given service source based on underlying source performance); vi) data precision (what is the underlying quantified error in the source data of a particular data source); vii) data confidence (for a given expected error in and underlying source datum, how does the observed distribution of collected data vary from the expected distribution of quantified error); and viii) data availability (for a given operational area, where would be expect to have service availability). The result of collecting and processing these metrics inline is that the aviation routing and processing engine 204 has the ability to automatically self-report both i) failure of the aviation routing and processing engine 204 to meet the required system performance for navigation and safety and ii) the event of any upstream data source violating its expected service level to conform to an overall system performance for navigation and safety. The result is that the aviation routing and processing engine 204 has the ability to differentially quantify and publish service levels geotemporally, allowing for graceful degradation of service in the event of a sensor or system failure of a contributing system in the field.

Not only is the monitoring of data service performance critical to ensuring a reliable overall transportation information exchange system 100 and the ability to meet system performance standards and FAA requirements, it also allows the aviation routing and processing engine 204 to provide critical metadata for any given data source within the overall multi-domain NAS. This metadata can be used by data consumers, in the context of FAA regulations and industry standards, to assess the overall performance level of information sharing for a given geotemporal volume in the NAS, and this aggregated metadata can then be applied to performance-based navigation standards. An example of a performance-based navigation standard is the Instrument Flight Rules (IFR) approach procedure (a procedure that allows pilots to land at an airport with very low visibility) that requires the airport to have both an AWOS and an Instrument Landing System (ILS). The airport is required to provide operational status of these systems, and the pilot must ascertain status before commencing an IAP approach-if the systems are not performing, an IAP approach is not permitted. By virtue of providing data source performance metadata in conjunction with actual cross-domain data processing and routing, the aviation routing and processing engine 204 allows for the dynamic application of these performance metadata in the context FAA performance based navigation regulations by domain-native systems (avionics, USS, PSU, GCS) to define, in real-time, the navigational and flight procedures that are safe and allowable for any given geotemporal volume, at any time, by clearly identifying if a given cross-domain data source is within required performance boundaries.

In various embodiments, the aviation routing and processing engine 204 may include a logging and monitoring service that supports automatic recovery and aviation routing and processing engine 204 performance reporting. In other embodiments of method 500, the aviation routing and processing engine 204 includes deployment automation module that supports automatic recovery, control of access to the environment and codebase, and which support necessary performance requirements and configuration managed system changes.

Figure 6:
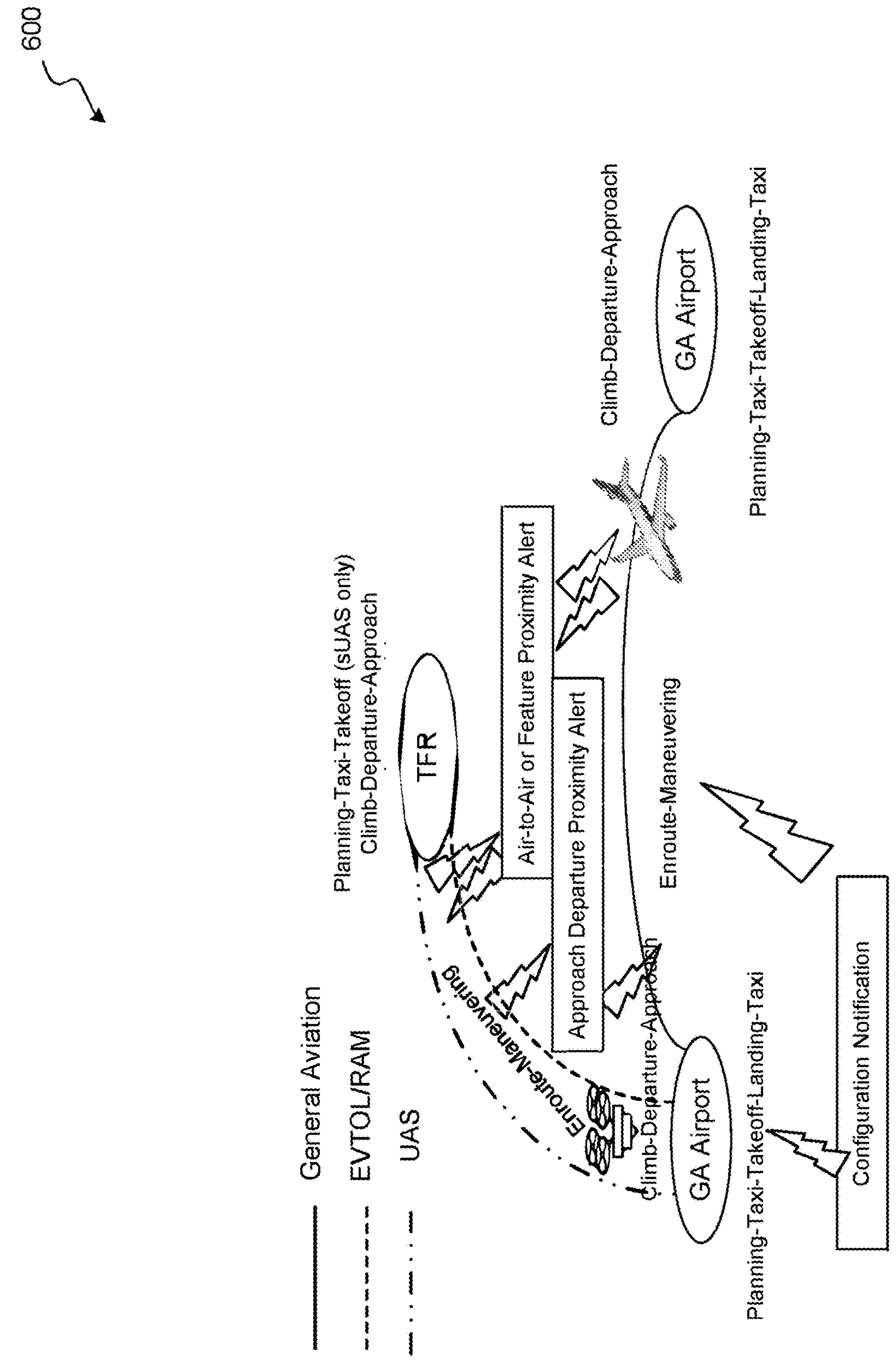
FIG. 6 illustrates an example of the transportation information exchange system based on types of routing rules during phases of flight during the method of FIG. 5, in accordance with some embodiments of the present disclosure.

The example processing and routing rules, combined with the aviation routing and processing engine 204 process and domain native data standards and transmission methods, allow cross-domain information sharing to occur and for rules to be applied in different phases of flight based on the processing and routing rule. FIG. 6 below describes the phases of flight and how these might apply by platform and phase. For example, a NAS configuration change from FAA services could be shared with a general aviation aircraft during planning, taxi or takeoff, while a proximity alert to an obstacle, another general aviation aircraft or a UAS could occur during takeoff, landing, or enroute maneuvering by sharing the position telemetry data of aircraft in other domains through the native avionics in the aircraft or the electronic flight bag. Conversely, if a UAS is operating in a stored, pre-defined risk area in proximity to the general aviation airport, the position telemetry data relating to the general aviation aircraft obtained either through ADS-B or through direct position sharing could be shared with the UAS in the enroute maneuvering phase via a USS and the GCS of the UAS provided both aircraft are within the constraint area of the general aviation airport allowing the UAS pilot additional time to divert from the flight intent of the general aviation aircraft.

Figure 7:
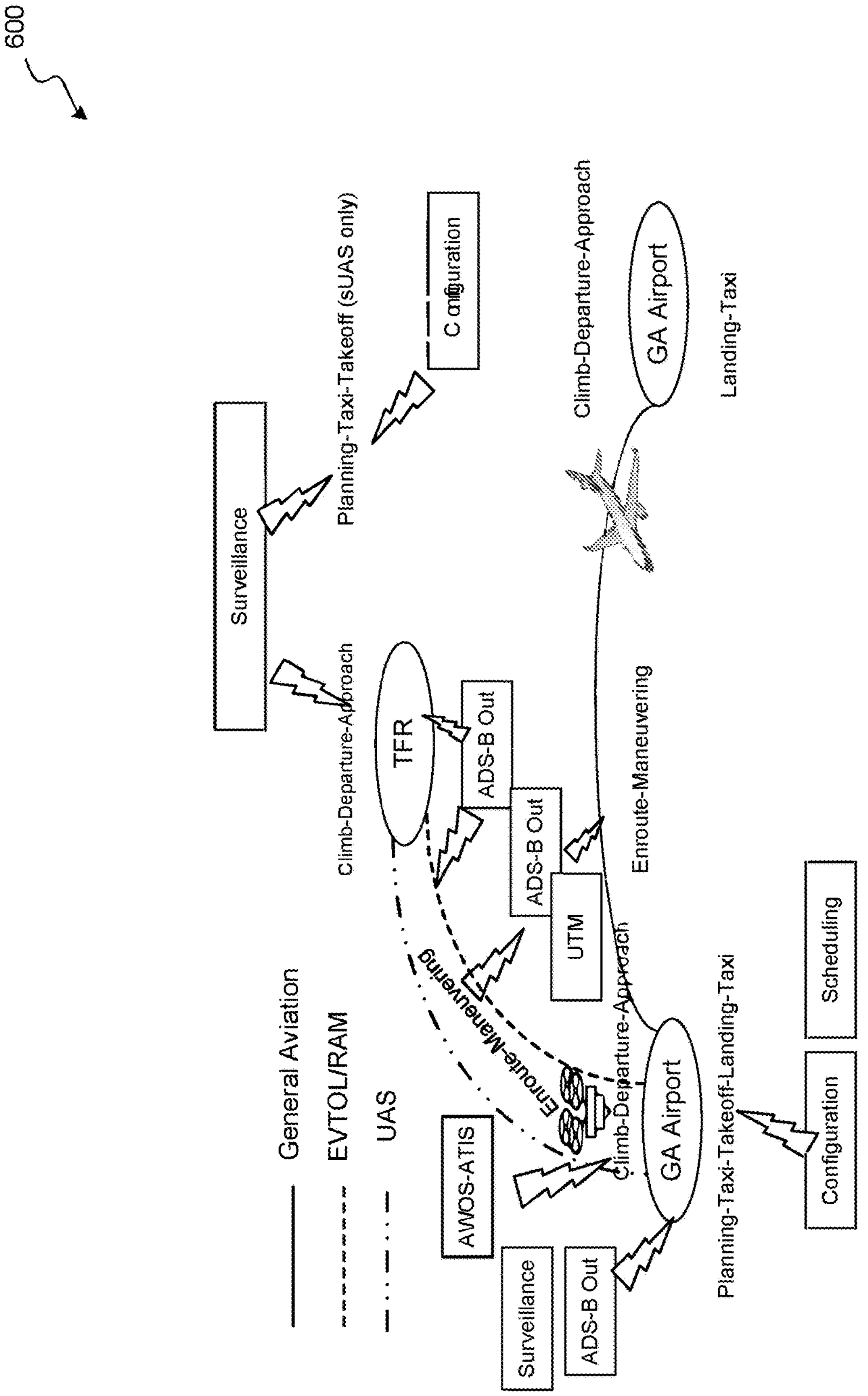
FIG. 7 illustrates an example of the transportation information exchange system based on types of transmission during phases of flight during the method of FIG. 5, in accordance with some embodiments of the present disclosure.

The same description of the application of processing and routing rules can be recast from the perspective of the processing and routing rule relative to the phase of flight to the domain-specific native system used to share certain types of information under certain rulesets and how this information is transmitted to the domain-specific operator or pilot for a given phase of flight. The rulesets are designed to maximize situational awareness so that operators and pilots can reach fully informed decisions about risk and make potential modifications of flight intent to avoid risk of conflict while also seeking to minimize unnecessary information and cognitive overload of the pilot or operator. FIG. 7 describes potential domain-specific systems that would be used with different domain-specific platforms in different phases of flight to support cross-domain information sharing and situational awareness. FIG. 7 describes that, given the processing and routing rule and a given domain-specific participant and phase of flight, a different data transmission or sharing method may be specified in the stored, pre-defined the aviation routing and processing engine 204 processing and routing rule.

Figure 8:
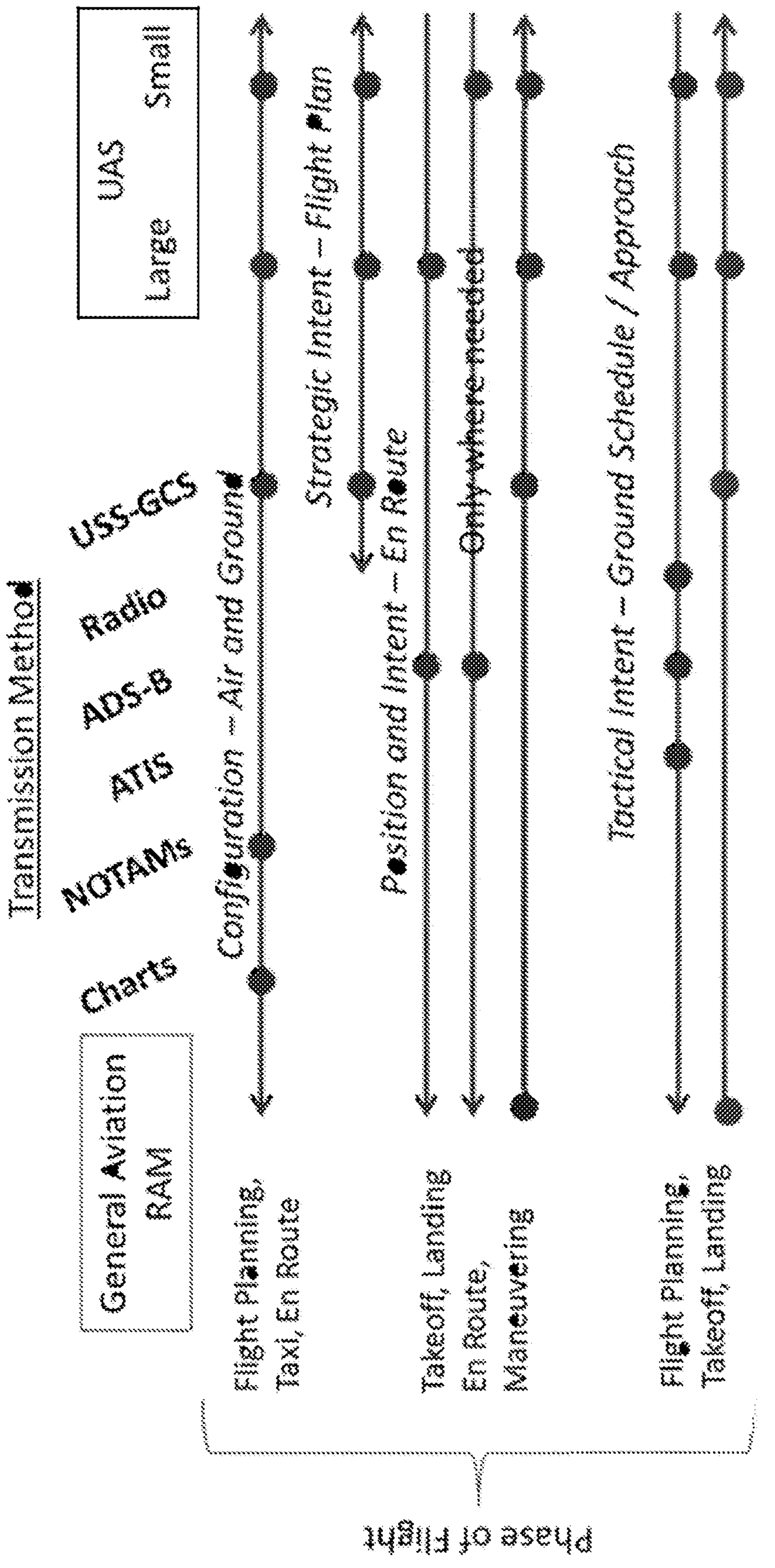
FIG. 8 illustrates example transmission methods and information types during the method of FIG. 5, in accordance with some embodiments of the present disclosure.

Another way to describe the use of domain-native information systems and transmission methods in cross-domain information sharing through data processing and routing is to explore the "direction" in which information is shared between domain-specific platforms, what type of information is shared by domain platform, and what transmission and display method is optimal for the receiving platform. Through the application of stored, pre-defined processing and routing rules, key information types (such as position and intent, NAS configuration changes) can be shared by and between domain-specific participants (such as UAS and general aviation) through multiple domain-native systems, as described in FIG. 8. As described in FIG. 8, a given domain specific platform on either end of the diagram can provide a given information type from a domain-native system such as ADS-B or the GCS for a given Phase of Flight (as described on the left side of the diagram) and information can be offloaded to the vehicle in the other domain on the opposite side of the diagram at specific offload points (transmission methods) are described across the top of the diagram. As described in the diagram, the processing and routing rules allow these offload points to be grouped by information class, such as NAS Configuration change, position, or intent.

Thus, systems and methods of the present disclosure provide transportation information exchange and can consume multiple domain-native data and information types from multiple domain native systems and transmitted on multiple domain-native data transmission protocols. The transportation information exchange systems and methods can interpret these multiple domain-native data and information types through the use of pre-defined, stored data standards and structure documentation and transform them in to domain specific information types and transmission protocols for data consumers of the data. As such, the systems and methods include the ability to improve safety, such as maintaining separation in high density environments; the ability to improve pilot performance, by providing the right information at the right time; and the ability to maintain overall NAS system performance by using information processing and routing rules to only exchange necessary information, thereby not overloading existing and future aviation communications and avionics systems.

Figure 10:
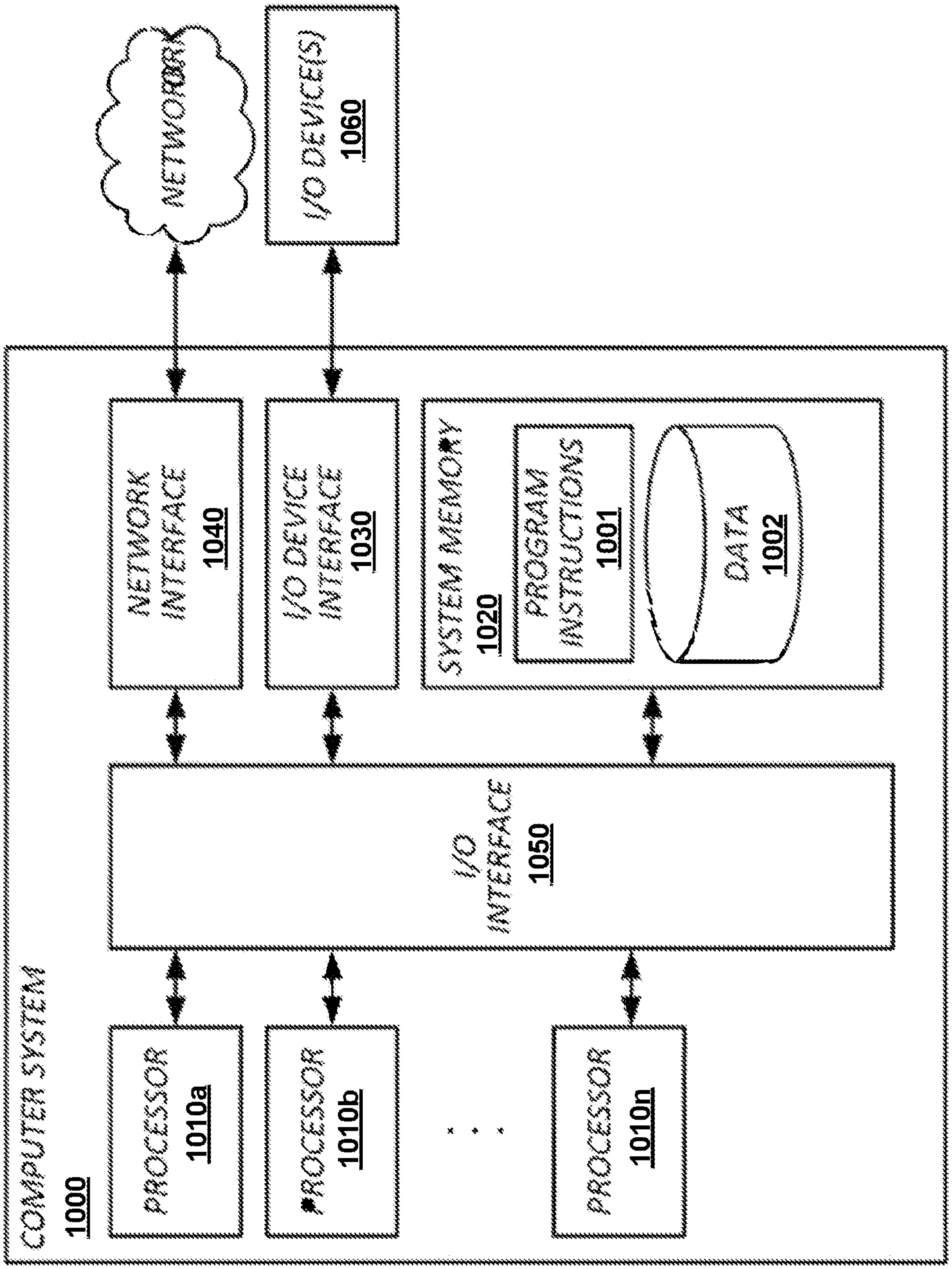
FIG. 10 shows an example of a computing device by which the present techniques may be implemented, in accordance with some embodiments of the present disclosure.

FIG. 10 is a diagram that illustrates an exemplary computing system 1000 in accordance with embodiments of the present technique. Various portions of systems and methods described herein, may include or be executed on one or more computer systems similar to computing system 1000. For example, the general aviation aircraft 103, the unmanned vehicle 105, the transportation information exchange service platform 130/200, the remote monitor 120, ground control stations 145, third party systems 150, or the sensor 155 may include the computing system 1000. Further, processes, operations, services, and modules described herein may be executed by one or more processing systems similar to that of computing system 1000.

Computing system 1000 may include one or more processors (e.g., processors **1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010***a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1001 or data 1002. Program instructions 1001 may be executable by a processor (e.g., one or more of processors 1010*a*-1010*n*) to implement one or more embodiments of the present techniques. Instructions 1001 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provide by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. An aviation information exchange system, including: one or more processors; and memory storing instructions that when executed by the processors cause the processors to effectuate operations, comprising: receiving, by a computer system, first data from a first aviation data source, wherein the first data is provided in a first data format type; determining, by the computer system based on a set of routing rules, a first aviation consumer of at least a first portion of the first data; processing, by the computer system, the first portion of the first data into a second data format type associated with the first aviation consumer; and providing, by the computer system, the first portion of the first data in the second data format type to the first aviation consumer.
2. The system of embodiment 1, wherein the operations further comprise: validating, by the computer system using a set of predefined data structures, when the first data from the first aviation data source; reporting, by the computer system, the first data as invalid when the first data does not satisfy the set of predefined data structures; and forwarding, by the computer system, the first data for routing with the set of routing rules when the first data satisfies the set of predefined data structures.
3. The system of any one of embodiments 1 or 2, wherein the operations further comprise: parsing, by the computer system, the first data into a generic set of attributes prior to performing the step of determining the first aviation consumer; and storing, by the computer system, the generic set of attributes in a storage database, wherein the first portion of the first data is obtained from the stored generic set of attributes.
4. The system of any one of embodiments 1-3, wherein the operations further comprise: queuing, by the computer system, the first portion of the first data in the second data format type on a message queue, wherein the message queue provides the first portion of the first data in the second data format type to the first aviation consumer.
5. The system of any one of embodiments 1-4, wherein the first data is received according to a first transmission protocol and the first portion of the first data in the second data format type is provided to the first aviation consumer according to a second transmission protocol that is different than the first transmission protocol.

6. The system of any one of embodiments 1-5, wherein the operations further comprise: determining, by the computer system based on the set of routing rules, a second aviation consumer of at least a second portion of the first data; processing, by the computer system, the second portion of the first data into a third data format type associated with the second aviation consumer; and providing, by the computer system, the second portion of the first data in the third data format type to the second aviation consumer.

7. The system of any one of embodiments 1-6, wherein the operations further comprise: receiving, by the computer system, second data from a second aviation data source that is the first aviation consumer, wherein the second data is provided in the second data format type; determining, by the computer system based on the set of routing rules, a second aviation consumer of at least a first portion of the second data; processing, by the computer system, the first portion of the second data into a third data format type associated with the second aviation consumer; and providing, by the computer system, the first portion of the second data in the third data format type to the second aviation consumer.

8. The system of embodiment 7, wherein the second aviation consumer is the first aviation data source and the third data format type is the first data format type.

9. The system of embodiment 7, wherein the processing the first portion of the second data into a third data format type associated with the second aviation consumer and the processing the first portion of the first data into a second data format type associated with the first aviation consumer are performed in parallel.

10. The system of any one of embodiments 1-9, wherein the operations further comprise: collecting, by the computer system, performance data associated with the first aviation data source and the computer system; determining, by the computer system and a set of performance conditions, that the performance data indicates a performance issue; and alerting, by the computer system, the first aviation consumer that a performance issue is occurring.

11. A method including any of the operations of embodiments 1-10.

12. A non-transitory, machine-readable medium storing instructions that, when executed by one or more processors, effectuate operations including any of the operations of embodiments 1-10

What is claimed is:

1. A transportation information exchange system, including:

one or more processors; and memory storing instructions that when executed by the one or more processors cause the one or more processors to effectuate operations, comprising:

receiving first data from a first transportation data source, wherein the first data is provided in a first data format type;

identifying, based on the first data, a vehicle type associated with the first transportation data source;

identifying a communication mode associated with the vehicle type;

determining a set of routing rules using the vehicle type and a geospatial position;

communicating the set of routing rules using the communication mode;

parsing the first data into a generic set of attributes;

determining, based on the set of routing rules, a first transportation consumer of at least a first portion of the first data;

processing a set of the generic set of attributes associated with the first portion of the first data into a second data format type associated with the first transportation consumer;

providing the first portion of the first data in the second data format type to the first transportation consumer;

receiving second data from a second transportation data source that is the first transportation consumer, wherein the second data is provided in the second data format type;

determining, based on the set of routing rules, a second transportation consumer of at least a first portion of the second data, wherein the second transportation consumer is the first transportation data source;

processing the first portion of the second data into the first data format type associated with the second transportation consumer; and providing the first portion of the second data in the first data format type to the second transportation consumer.

2. The system of claim 1, wherein the first transportation data source is a vehicle.

3. The system of claim 2, wherein the vehicle is an unmanned vehicle.

4. The system of claim 1, wherein the operations further comprise:

storing the generic set of attributes in a storage database.

5. The system of claim 4, wherein the storage database includes a first type storage device and a second type storage device, and wherein a first portion of the generic set of attributes that satisfies a first frequency of use condition is stored in the first type storage device and a second portion of the generic set of attributes that satisfies a second frequency of use condition is stored in the second type storage device.

6. The system of claim 5, wherein the first type storage device is cache memory.

7. The system of claim 1, wherein the first portion of the second data causes the second transportation consumer to make modifications to navigation intent.

8. The system of claim 1, wherein the operations further comprise:

validating, using a set of predefined data structures, the first data from the first transportation data source;

reporting the first data as invalid when the first data does not satisfy the set of predefined data structures; and forwarding the first data for routing with the set of routing rules when the first data satisfies the set of predefined data structures.

9. The system of claim 1, wherein the operations further comprise:

queuing the first portion of the first data in the second data format type on a message queue, wherein the message queue provides the first portion of the first data in the second data format type to the first transportation consumer.

10. The system of claim 1, wherein the first data is received according to a first transmission protocol and the first portion of the first data in the second data format type is provided to the first transportation consumer according to a second transmission protocol that is different than the first transmission protocol.

11. The system of claim 1, wherein the operations further comprise:

determining based on the set of routing rules, a third transportation consumer of at least a second portion of the first data;

processing the second portion of the first data into a third data format type associated with the third transportation consumer; and providing the second portion of the first data in the third data format type to the third transportation consumer.

12. The system of claim 1, wherein the processing the first portion of the second data into the first data format type associated with the second transportation consumer and the processing the first portion of the first data into the second data format type associated with the first transportation consumer are performed in parallel.

13. The system of claim 1, wherein the operations further comprise:

collecting performance data associated with the first transportation data source and the transportation information exchange system;

determining a set of performance conditions, that the performance data indicates a performance issue; and alerting the first transportation consumer that the performance issue is occurring.

14. The system of claim 1, wherein the operations further comprise:

providing metadata for the first transportation data source and the second transportation data source; and applying the metadata to allow for a dynamic application of safety procedures based on geospatial position and time.

15. The system of claim 1, wherein the first portion of the second data causes the second transportation consumer to perform a vehicle maneuver.

16. A transportation information exchange method, comprising:

receiving, by a computer system, first data from a first transportation data source, wherein the first data is provided in a first data format type and the first transportation data source is a vehicle;

determining, by the computer system, based on a set of routing rules, a first transportation consumer of at least a first portion of the first data;

processing, by the computer system, the first portion of the first data into a second data format type associated with the first transportation consumer;

providing, by the computer system, the first portion of the first data in the second data format type to the first transportation consumer;

receiving, by the computer system, second data from a second transportation data source that is the first transportation consumer, wherein the second data is provided in the second data format type;

determining, by the computer system, based on the set of routing rules, a second transportation consumer of at least a first portion of the second data, wherein the second transportation consumer is the first transportation data source;

processing, by the computer system, the first portion of the second data into the first data format type associated with the second transportation consumer;

providing, by the computer system, the first portion of the second data in the first data format type to the second transportation consumer;

determining, by the computer system, based on the set of routing rules, a third transportation consumer of at least a second portion of the first data;

processing, by the computer system, the second portion of the first data into a third data format type associated with the third transportation consumer; and providing, by the computer system, the second portion of the first data in the third data format type to the third transportation consumer.

17. The method of claim 16, further comprising:

parsing, by the computer system, the first data into a generic set of attributes, wherein a set of the generic set of attributes associated with the first portion of the first data are processed into a second data format type associated with the first transportation consumer.

18. A transportation information exchange method, comprising:

receiving, by a computer system included in a transportation information exchange system, first data from a first transportation data source, wherein the first data is provided in a first data format type;

parsing, by the computer system, the first data into a generic set of attributes;

determining, by the computer system, based on a set of routing rules, a first transportation consumer of at least a first portion of the first data;

processing, by the computer system, a set of the generic set of attributes associated with the first portion of the first data into a second data format type associated with the first transportation consumer;

providing, by the computer system, the first portion of the first data in the second data format type to the first transportation consumer;

receiving, by the computer system, second data from a second transportation data source that is the first transportation consumer, wherein the second data is provided in the second data format type;

determining, by the computer system, based on the set of routing rules, a second transportation consumer of at least a first portion of the second data;

processing, by the computer system, the first portion of the second data into the first data format type associated with the second transportation consumer;

providing, by the computer system, the first portion of the second data in the first data format type to the second transportation consumer;

collecting, by the computer system, performance data associated with the first transportation data source and the transportation information exchange system;

determining, by the computer system, a set of performance conditions, that the performance data indicates a performance issue; and alerting, by the computer system, the first transportation consumer that the performance issue is occurring.

19. The method of claim 18, wherein the second transportation consumer is the first transportation data source.

* * * * *